United States Patent [19]

Okumura et al.

[11] Patent Number: 5,119,413
[45] Date of Patent: Jun. 2, 1992

[54] SYSTEM AND METHOD TO ALTER THE FUNCTIONS ASSIGNED TO THE KEYS OF A TERMINAL CONNECTED TO AN ELECTRONIC EXCHANGE

[75] Inventors: Yukiko Okumura, Mitaka; Kimitoshi Shin, Akishima, both of Japan

[73] Assignee: Kabushiki Kaisha Toshiba, Kawasaki, Japan

[21] Appl. No.: 494,108

[22] Filed: Mar. 15, 1990

[30] Foreign Application Priority Data

Mar. 16, 1989 [JP] Japan .................................. 1-64324

[51] Int. Cl.⁵ ............................................ H04M 1/66
[52] U.S. Cl. .................... 379/156; 379/157; 379/201
[58] Field of Search ............... 379/156, 165, 161, 201, 379/157

[56] References Cited

U.S. PATENT DOCUMENTS 4,595,800  6/1986  Nagatomi et al. .................. 379/165
4,605,825  8/1986  Komuro et al. .................... 179/99 R
4,897,866  1/1990  Majmudar et al. ............... 379/201 X Primary Examiner—James L. Dwyer
Assistant Examiner—Ahmad F. Matar
Attorney, Agent, or Firm—Finnegan, Henderson, Farabow, Garrett and Dunner

[57] ABSTRACT

An electronic exchange system comprising a telephone exchange for connecting at least extension lines and office lines, and at least an extension terminal which can be connected to the exchange, which has keys and can function as a communication device is disclosed. The terminal has a first memory device for storing key-assign data consisting of the codes of the keys, a data-receiving device for receiving the key-assign data, a memory control device for writing into the first memory device the key-assign data received from the telephone exchange, and a first control device for retrieving a key code from the first memory device and supplying the key code to the telephone exchange when the key identified by the key code is operated. The telephone exchange comprises a second memory device for storing the key-assign data and the data items representing the functions of the keys, a second control device for reading the key-assign data from the second memory and supplying it to the terminal, upon determining that the terminal is connected to the telephone exchange, and a third control device for performing the functions specified by the key codes transmitted from the terminal and also by the data items stored in the second memory. The function of the keys are assigned can be altered, only by altering the contents of the second memory device.

8 Claims, 12 Drawing Sheets

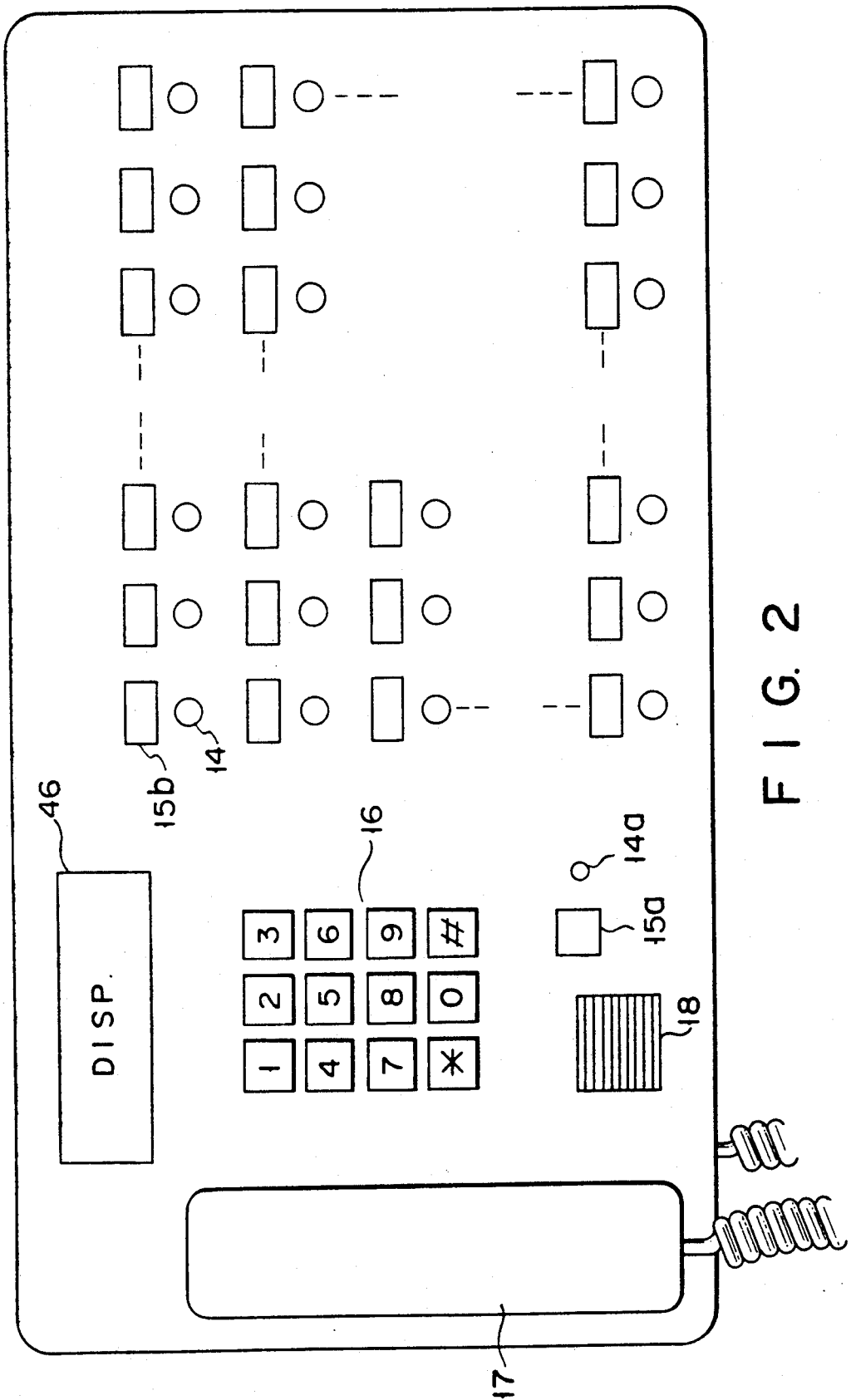
F I G. 2

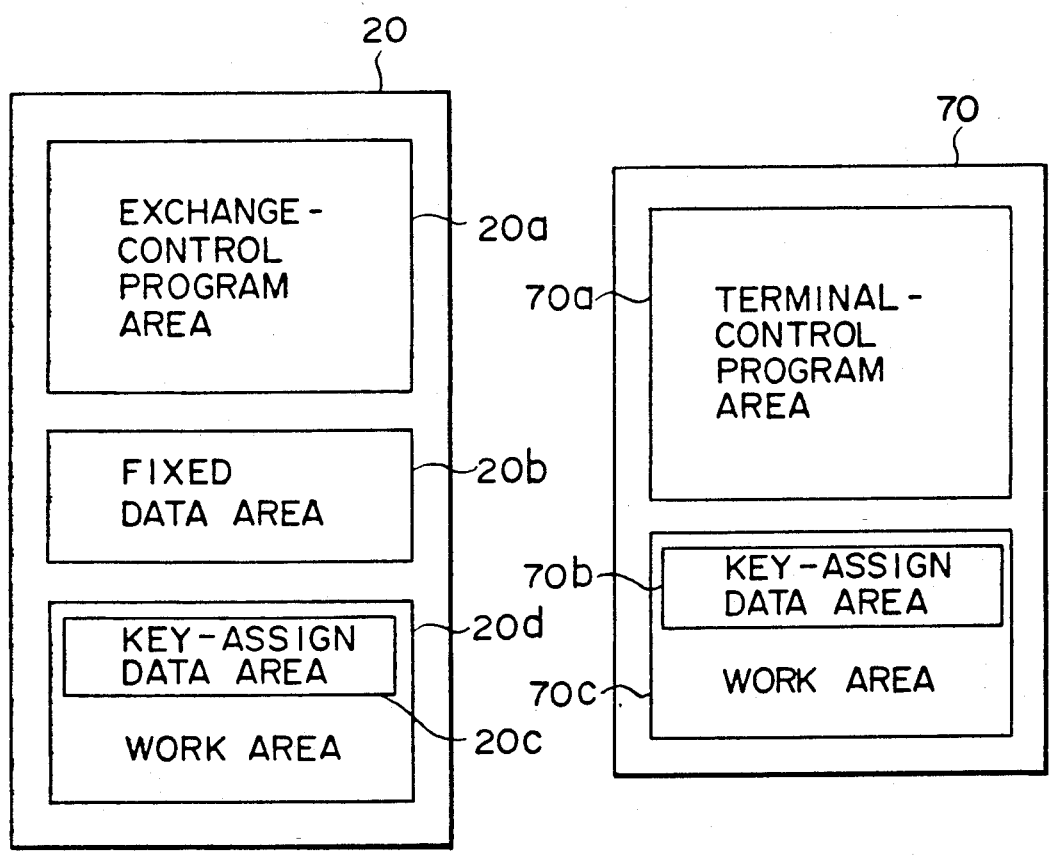
F I G. 3  F I G. 4

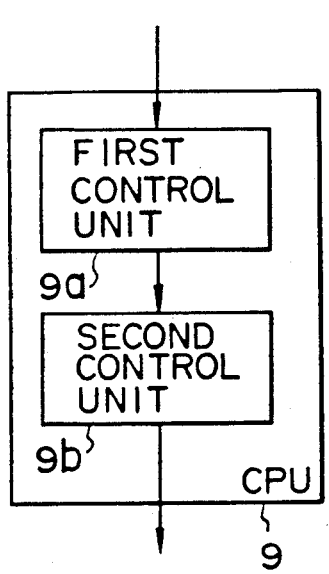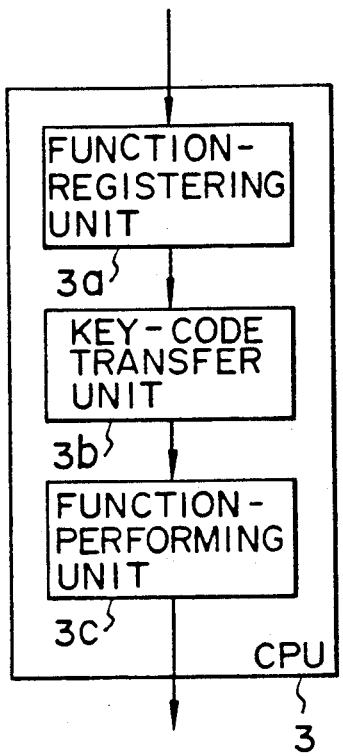
F I G. 10    F I G. 11
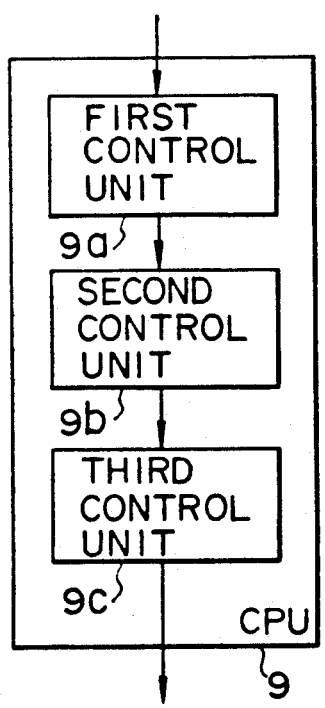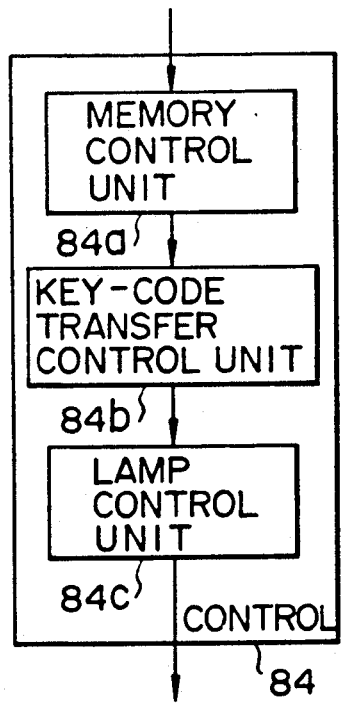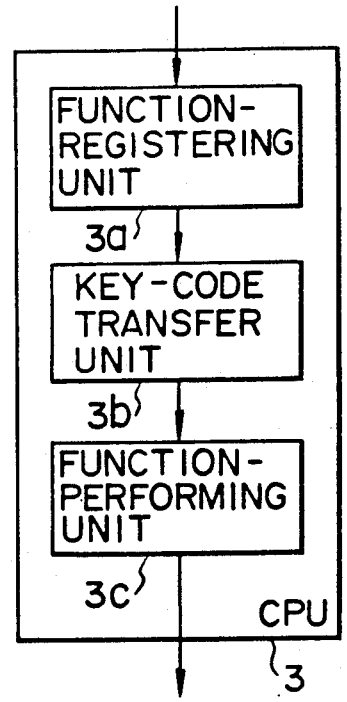
F I G. 12    F I G. 13    F I G. 14

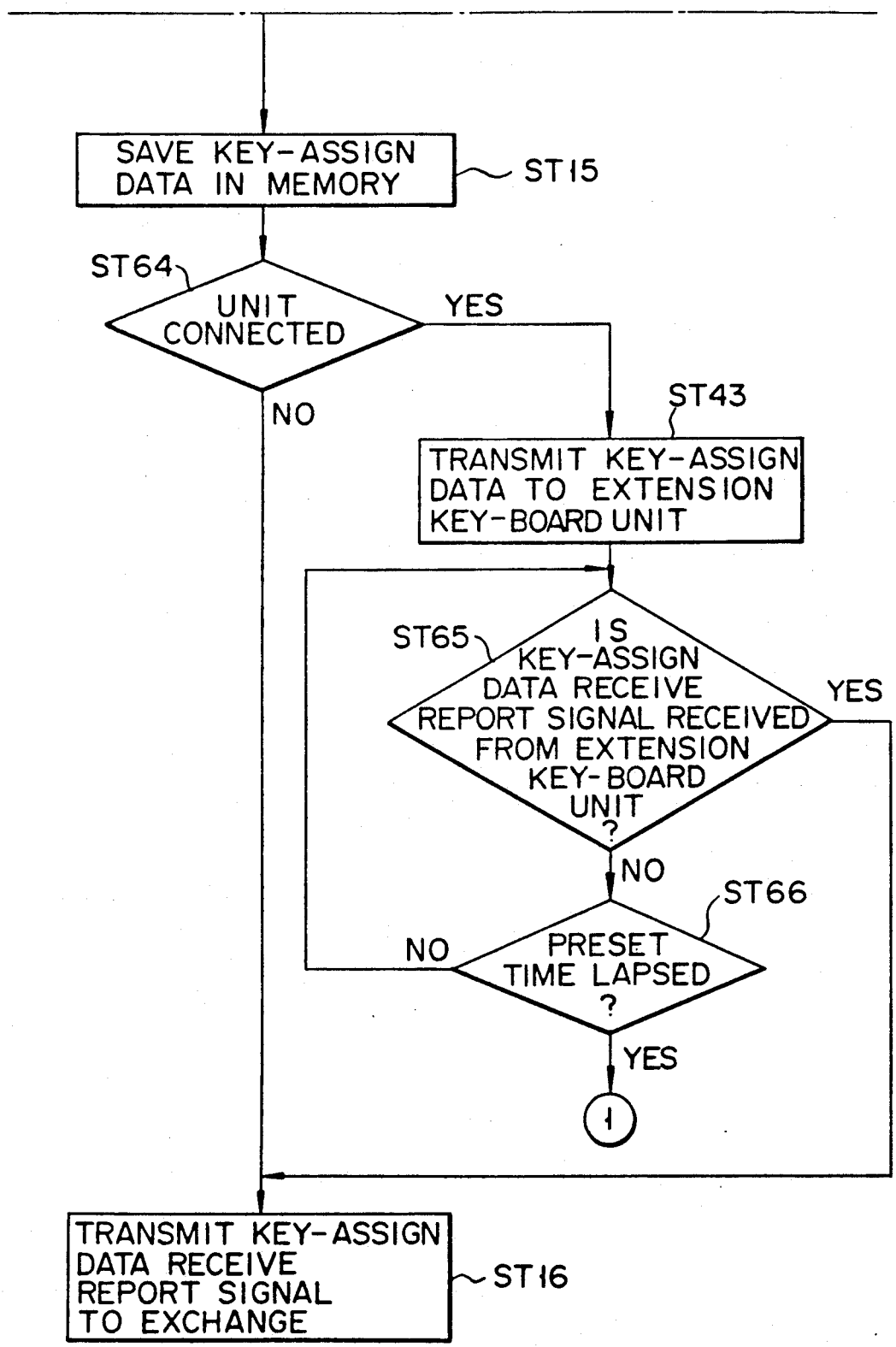
F I G. 15 B

SYSTEM AND METHOD TO ALTER THE FUNCTIONS ASSIGNED TO THE KEYS OF A TERMINAL CONNECTED TO AN ELECTRONIC EXCHANGE

BACKGROUND OF THE INVENTION

1. Field of the Invention

The present invention relates to an electronic exchange system, wherein it is easy to alter the functions assigned to the keys of a terminal, and also to a method of controlling such an electronic exchange system.

2. Description of the Related Art

Various types of electronic exchanges are used in telephone networks. Among them is a private branch exchange (hereinafter referred to as "PBX"). The PBX comprises a microcomputer. It can perform many functions at high efficiency, owing to the application of software to the microcomputer. Hence, the PBX not only can perform switching of telephone lines, but also can provide other various services.

The terminals connected to the PBX, such as extension telephones and attendants, also each have a microcomputer can perform various functions, and are highly intelligent. For example, an attendant comprises a microcomputer. It further comprises a handset, a response switch, extension switches, indicator lamps (e.g., LEDs), and a buzzer. The extension switches are to be coupled to extension telephone lines. The indicator lamps are provided for the switches (i.e., the response switch and the extension switches), respectively.

In use, the attendant is connected to the PBX. When the PBX receives a call through an external telephone line (hereinafter referred to as "office line"), it supplies a ringing signal to the attendant. In response to the ringing signal, the buzzer incorporated in the attendant generates an alarm. Hearing this alarm, the human operator at the attendant takes the handset and pushes the response switch. When the response switch is thus pushed, the attendant generates a signal. In response to this signal, the PBX connects the office line to the attendant. As a result, the operator and the caller on the other side of the office line can talk with each other. The operator asks whom the caller wants to talk to.

Upon hearing whom the caller wishes to talked to, the operator checks whether the indicator lamp is on or off which is assigned to the extension telephone of the person being called.

If the indicator lamp is off, indicating that the extension telephone is not occupied, the operator pushes the extension switch. Then, the PBX sets the office line into a "suspended state," and supplies a ringing signal to the extension telephone through the attendant and the extension telephone line so that the extension telephone rings. Then, the receiver of the extension telephone is taken off the cradle. The operator asks the user of the extension telephone whether or not the user desires to receive the call. If the user says he or she will receive the call, the operator performs a transfer operation. The PBX connects the extension telephone to the attendant, enabling the operator to speak with the caller. The operator tells the called person that the caller wants to talk to him or her. When the operator hears that the called party wants to speak to the caller, then he or she operates the attendant, thereby releasing the office line from the suspended state and connecting it to the extension telephone line. As a result, the caller and the called party can talk with each other.

As has been described, the attendant has a number of key switches assigned to respective specific functions. These functions are performed by operating the key switches, under the control of the software applied to the microcomputer incorporated in the PBX. In other words, the functions to which the key switches are assigned are controlled by the PBX. When the operator pushes one of the key switches, for example, the extension key which is assigned to the connection of the office line to the extension telephone line A, the attendant generates a signal representing the code allotted to this key switch. The code signal is transmitted to the PBX.

It should be noted that the PBX further comprises an I/O port and a memory. The I/O port is connected to the attendant. The memory stores key-assign data which is a key-data table showing the codes of the key switches, the functions to which the key switches are assigned, and the logical numbers of the buzzer and indicator lamps of the attendant.

Hence, when the code signal representing the code, which is allotted to the extension switch the operator has pushed, is transmitted to the microcomputer of the PBX through the I/O port, the PBX supplies the attendant with the data item representing the logical number of the indicator lamp provided for the pushed extension switch. In the attendant, the indicator lamp identified by this data item is turned on.

The memory incorporated in the PBX has memory areas, which includes a key-assign data area, an exchange-control program area, a fixed data area, and a work area. The key-assign data, described above, is stored in the key-assign data area.

As is evident from the above, both the attendant and the PBX are controlled in accordance with the software. Therefore, the key switches of the attendant can be assigned to various functions in any arbitrary way, and these functions are performed by operating the key switches under the control of the PBX.

Generally, in an electronic exchange system comprising an electronic exchange and an intelligent terminals (e.g., an attendant), when any one of the key switches of the terminal is pushed, the terminal generates a signal representing the code of the pushed key switch and supplies this code signal to the telephone exchange. In response to the code signal, the telephone exchange performs the function to which the pushed switch is assigned, or telephone exchanging, in accordance with the code signal. To enable the telephone exchange to perform not only the telephone exchanging but also the function to which any pushed switch is assigned, both the terminal and the electronic exchange identify any switch key of the terminal that has been pushed.

With the conventional electronic exchange system, it is indeed possible to assign the key switches of the terminal to various function arbitrarily. However, once the key switches have been assigned to specific functions, respectively, by the manufacturer of the system, it is no longer possible for the user to alter the key assignment unless the user changes the programs stored in the memories of both the terminal and the electronic exchange. Usually it is very difficult for the user to change these programs. The flexibility of software control is not completely utilized in the conventional electronic exchange systems.

SUMMARY OF THE INVENTION

Accordingly, it is the object of the present invention to provide an electronic exchange system with which it is easy to alter the functions assigned to the key switches of a terminal in accordance with an operator's needs, and which is therefore operator-friendly.

According to a first aspect of the present invention, there is provided an electronic exchange system which comprises a telephone exchange for connecting extension lines to one another and also connecting an office line to any extension line, and a terminal adapted to be connected to the exchange, having a plurality of keys and designed to function as a communication device as well.

The terminal comprises a first memory device for storing key-assign data consisting of the codes of the keys, a data-receiving device for receiving the key-assign data, a memory control device for instructing the first memory device to store the key-assign data which the data-receiving device has received from the telephone exchange, and a first control device for reading a key code from the first memory device and supplying the key code to the telephone exchange when the key identified by the key code is operated. The memory control device is enabled to receive the key-assign data when the terminal is initialized.

The telephone exchange comprises a second memory device for storing the key-assign data and the data items representing the functions to which the keys are assigned, a second control device for reading the key-assign data from the second memory and supplying it to the terminal, upon determining that the terminal is connected to the telephone exchange, and a third control device for performing the functions specified by the key codes transmitted from the terminal and also by the data items stored in the second memory.

As has been pointed out, when the terminal is initialized, the first memory device is rendered ready to store the key-assign data. At the same time, the second control device supplies the key-assign data to the terminal. These key-assign data are stored into the first memory device under the control of the memory control device. Thereafter, when an operator at the terminal pushes any one of the keys, the first control device reads the code of this key from the first memory device and supplies the key code to the telephone exchange. The exchange identifies that data item stored in the second memory device which corresponds to the key code, and then performs the function represented by the data item.

Since the key-assign data stored in the second memory means is automatically stored into the first memory device when the terminal is initialized, the operator need not operate the terminal to store the key-assign data into the first memory device. In view of this, the system according to the invention is operator-friendly.

Also, the operator need not operate the keys of the terminal to alter the key assignment. It is sufficient for him or her to operate the keys of the telephone exchange to alter the key assignment. In this respect, too, the system of the invention is operator-friendly.

According to a second aspect of the present invention, there is provided an electronic exchange system which comprises a telephone exchange for connecting extension lines to one another and also for connecting an office line to any extension line, with a terminal adapted to be connected to the exchange, having a plurality of keys and designed to function as a communication device, too. And an additional unit adapted to be connected to the terminal, having a plurality of keys and designed to generate the code of any of these keys that are operated.

The additional unit comprises an input/output device, a first memory means for storing data, and a first control device for supplying a start signal via the input/output device when the unit is initialized, for storing key-assign data supplied through the input/output device, into the first memory device, for reading the code of any one of the keys when the key is operated, and for outputting the key code.

The terminal comprises an interface device connected to the additional unit, for receiving signals from, and supplying signals to, the additional unit, a second memory device for storing the key-assign data consisting of the codes of the keys of the terminal and those of the additional unit, a data-receiving device for receiving the key-assign data when the terminal is initialized, and a memory control device for instructing the second memory device to store the key-assign data into the second memory device, for determining whether or not the additional unit is connected to the terminal, for reading the key-assign data for the additional unit from the second memory upon determining that the additional unit is connected to the terminal, and for supplying the key-assign data to the additional unit through the interface device. A second control device reads a key code from the first memory device and supplies the key code to the telephone exchange when the key identified by the key code is operated, and supplies a key code to the telephone exchange when the key code is transmitted to the interface means from the additional unit.

The telephone exchange comprises a third memory device for storing the key-assign data and the data items representing the functions to which the keys are assigned, a third control device for reading the key-assign data from the second memory and supplying it to the terminal, upon determining that the terminal is connected to the telephone exchange, and a fourth control device for performing the functions specified by the key codes transmitted from the terminal and also by the data items stored in the third memory.

As has been pointed out, when the additional unit is connected to the terminal, and the terminal is connected to the telephone exchange, the terminal is automatically initialized. At the same time, the second memory device is rendered ready to store the key-assign data. In the telephone exchange, the third control device reads the key-assign data from the second memory device and supplies it to the terminal, upon determining that the terminal is connected to the exchange. In the terminal, the second memory device stores the key-assign data. Of these data, the codes of the keys of the additional unit are transmitted to the additional unit. In the additional unit, these key codes are stored into the first memory device.

Thereafter, when an operator at the additional unit pushes any one of the keys, the first control device reads the code of this key from the first memory device and supplies the key code to the terminal. This key code is transmitted from the terminal to the telephone exchange. Similarly, when an operator at the terminal pushes any one of the keys, the second control device reads the code of this key from the second memory device and supplies the key code to the telephone exchange. The exchange identifies the data item stored in the third memory device and corresponding to the key code transmitted from either the additional unit or the terminal, and then performs the function represented by the data item.

As has been described, when the terminal is connected to the exchange and initialized, not only the key-assign data for the terminal, but also the key-assign data for the additional unit, are read from the third memory device and transmitted from the exchange to the terminal. Both types of data are stored into the second memory device. When the additional unit is connected to the terminal and initialized, the key-assign data for the additional unit is read from the second memory device and transmitted from the terminal to the additional device. This key-assign data is stored into the first memory device. Hence, in case the keys provided on the terminal are insufficient for connecting the office line to the extension lines, the additional unit is connected to the terminal, whereby the keys provided on the additional unit make up for any insufficiency.

Further, as has also been pointed out, when the terminal is connected to the telephone exchange, the keys of the terminal are automatically assigned to various functions in accordance with the data stored in the exchange. Similarly, when the additional unit is connected to the terminal, the keys of the additional unit are automatically assigned to various functions in accordance with the data stored in the exchange. Therefore, the operator need not operate the terminal to store the key-assign data into the second memory device. Nor does he or she need to operate the additional unit to store the key-assign data into the first memory device. In view of this, the system according to the invention is operator-friendly.

Moreover, the data items stored in the third memory device and representing the functions assigned to these keys can be altered by operating the keyboard of the telephone exchange. The key codes associated with the data items thus altered are automatically read from the third memory device and stored into the second memory device when the terminal is connected to the exchange, and those of the key codes which represent the keys of the additional unit are are automatically read from the second memory device and stored into the first memory device when the additional unit is connected to the terminal. Hence, the operator needs to operate neither the terminal nor the additional unit to alter the functions to which the keys of the terminal or the additional unit are assigned. In this respect, too, the system of the invention is operator-friendly.

According to a third aspect of the present invention, there is provided a method of controlling an electronic exchange system which comprises a telephone exchange for connecting extension lines to one another and also for connecting an office line to any extension line, and a terminal adapted to be connected to the exchange and having a plurality of keys.

The method comprises the steps of: storing key-assign data consisting of the codes of the keys and also the data items representing the functions to which the keys are assigned, into the telephone exchange; determining whether or not the terminal is connected to the telephone exchange, and supplying the data-assign data to the terminal when it is determined that the terminal is connected to the telephone exchange; enabling the terminal to receive the key-assign data when the terminal is initialized, and storing the key-assign data into the terminal when the terminal receives the key-assign data; supplying a key code from the terminal to the telephone exchange when the key identified by the key code is operated; and causing the telephone exchange to perform the functions specified by the key codes transmitted from the terminal and also by the data items stored in the telephone exchange.

In this method, when the terminal is connected to the telephone exchange, the key-assign data is automatically transmitted from the exchange to the terminal and stored into the terminal. When an operator at the terminal pushes any one of the keys, the code of this key is transmitted from the terminal to the exchange. The exchange identifies the data item corresponding to the kay code, and then performs the function represented by the data item.

Since the key-assign data is automatically supplied from the exchange to the terminal when the terminal is initialized, the operator need not operate the terminal to store the key-assign data into the terminal. Also, the operator need not operate the keys of the terminal to alter the key assignment. It is sufficient for him or her to operate the telephone exchange to alter the key assignment. In this respect, too, the system of the invention is operator-friendly.

According to a fourth aspect of the present invention, there is provided a method of controlling an electronic exchange system which comprises a telephone exchange for connecting extension lines to one another and also for connecting an office line to any extension line, and a terminal adapted to be connected to the exchange, having a plurality of keys and designed to function as a telephone, too, and an additional unit adapted to be connected to the terminal and having a plurality of keys.

This method comprises the steps of: storing key-assign data consisting of the codes of the keys of the terminal and those of the additional unit and also the data items representing the functions to which the keys are assigned, into the telephone exchange; determining whether or not the terminal is connected to the telephone exchange, and supplying the data-assign data to the terminal when it is determined that the terminal is connected to the telephone exchange; enabling the terminal to receive key-assign data from the telephone exchange when the terminal is initialized, and storing the key assign data into the terminal when the key-assign data is transmitted to the terminal from the telephone exchange; determining whether or not the additional unit is connected to the terminal, and supplying the key-assign data for the additional unit from the terminal to the additional unit when it is determined that the additional unit is connected to the terminal; storing into the additional unit the kay-assign data transmitted from the terminal when the terminal receives the key-assign data; supplying a key code from the additional unit to the terminal when the key identified by the key code is operated; supplying a key code from the terminal to the telephone exchange when that key of the terminal which is identified by the key code is operated, and also supplying to the telephone exchange a key code, if any, which has been transmitted from the additional unit to the terminal; and causing the telephone exchange to perform the functions specified by the key codes transmitted from the terminal and also by the data items stored in the telephone exchange.

In this method, when the terminal is connected to the telephone exchange, the key-assign data is automatically transmitted from the exchange to the terminal and stored into the terminal. When an operator at the terminal pushes any one of the keys, the code of this key is transmitted from the terminal to the exchange. The exchange identifies the data item corresponding to the key code, and then performs the function represented by the data item. Also, when the additional unit is connected to the terminal, the codes of the keys of the additional unit, i.e., part of the key-assign data, are automatically transmitted from the terminal to the additional unit and stored into the additional unit. When an operator at the terminal pushes any one of the keys, the code of this key is transmitted from the additional unit to the to the exchange through the terminal. The exchange identifies the data item corresponding to this key code, and then performs the function represented by the data item.

Since the key-assign data is automatically transmitted from the exchange to the terminal when the terminal is initialized, and that part of the key-assign data which are the codes of the keys of the additional unit is automatically transmitted from the terminal to the additional unit, the operator need not operate the terminal or the additional unit to store the key codes into the terminal and the additional unit. Nor is it necessary for the operator to operate the keys of the terminal or the additional unit to alter the key assignment. It is sufficient for him or her to operate the telephone exchange to alter the key assignment. In this respect, too, the system of the invention is operator-friendly.

BRIEF DESCRIPTION OF THE DRAWINGS

FIG. 2 is a plan view, illustrating the outer appearance of the attendant incorporated in the system shown in FIG. 1;

FIGS. 3 and 4 are diagrams representing the memory maps of the system shown in FIGS. 1 and 2;

FIG. 10 is a block diagram showing the terminal CPU 9 used in the system illustrated in FIG. 1;

FIG. 11 is a block diagram illustrating the CPU 3 shown in FIG. 1;

FIG. 12 is a block diagram showing the structure of the terminal CPU 9 used in the system illustrated in FIG. 7;

FIG. 13 is a block diagram showing the structure of the controller 84 incorporated in the additional unit (i.e., a keyboard) used in the system illustrated in FIG. 7;

FIG. 14 a block diagram showing the structure of the CPU 3 incorporated in the exchange exchange 1a of the system illustrated in FIG. 7; and FIGS. 15A and 15B form a flow chart explaining how the system shown in FIGS. 7 and 8 operates in a different way.

DETAILED DESCRIPTION OF THE PREFERRED EMBODIMENTS

Embodiments of the present invention will now be described in detail, with reference to the accompanying drawings. As will be understood from the following description, the embodiments are electronic exchange systems comprising an attendant each, used as a terminal. Nevertheless, the present invention can be applied to an electronic exchange system having telephones which are used as terminals.

Figure 1:
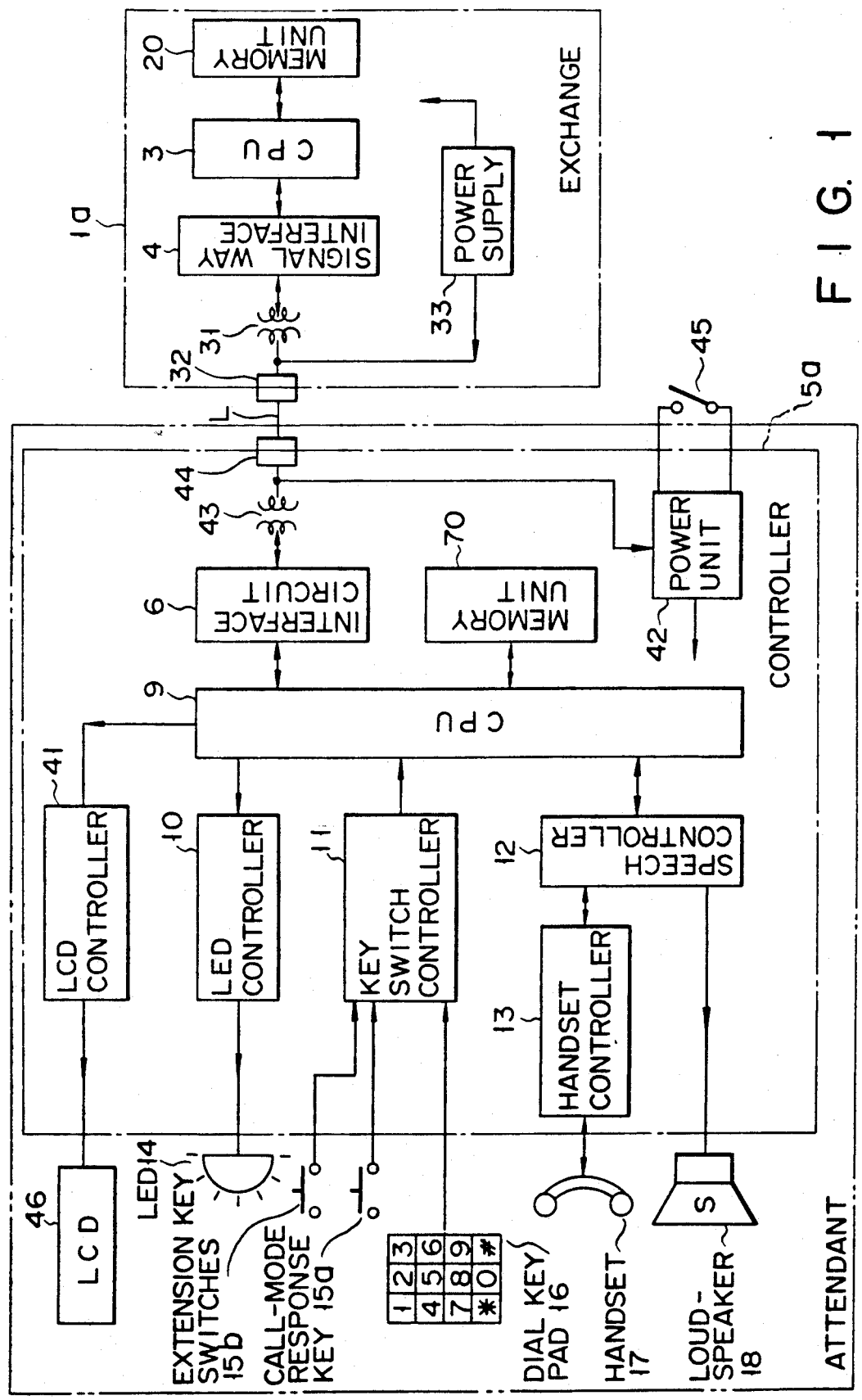
FIG. 1 is a block diagram showing an electronic exchange system according to a first embodiment of the present invention.

The electronic exchange system according to a first embodiment will first be described, with reference to FIG. 1, which is a block diagram. As is shown in FIG. 1, the electronic exchange system comprises an electronic exchange 1a and an attendant. The attendant comprises a controller 5a and some other components (later described).

The electronic exchange 1a is designed to connect office lines to extension telephone lines, and also to couple the extension telephone lines to one another. The exchange 1a comprises a line controller (not shown), a CPU (processor) 3, a control-signal way interface 4, a memory unit 20, a transformer 31, a connector 32, and a power supply 33.

The line controller is designed to transmit signals to, and receive signals from, any extension telephone line connected to an office line, and also to supply power to a connected extension telephone line.

The CPU 3 controls various telephone-exchange operations. The memory 20 comprises at least a ROM and a RAM. The ROM stores an initial program loader (IPL) program and the like. The CPU 3 executes the IPL program, so that the control programs for controlling telephone exchanging and specific functions are stored into the RAM. In other words, the RAM stores various programs which the CPU 3 is to execute and the data which the CPU 3 needs to execute these programs. The RAM has a program work area. The ROM of the memory unit 20 also stores a program which the CPU 3 executes to supply key-assign data (i.e., key code data) to the controller 5a. The key-assign data has been generated by operating a call-mode response key 15a of the attendant to initialize the controller 5a, and is stored into the RAM of the memory unit 20 through an input port (not shown) of the electronic exchange 1a. The CPU 3 executes the programs thus stored in the RAM, thereby performing the telephone exchanging, assigning the key switches of the attendant to special functions, and supplying data to the controller 5a.

The control-signal way interface 4 is connected by the transformer 31 to the connector 32. The interface 4 receives control signals to be transmitted to the exchange 1a, and supplies control signals to the controller 5a. The connector 32 is connected to a line L.

The power supply 33 supplies power to the other components of the electronic exchange 1a. It supplies power to the controller 5a, too. More specifically, a DC current of about 20 V is applied from the power supply 33 via the connector 32 to the line L. The transformer 31 electrically insulates the power supply 33 from the signal system of the exchange 1a.

As is shown in FIG. 1, the attendant includes a plurality of LEDs 14, a response switch (not shown), a call-mode response key 15a, a plurality of extension key switches 15b, a dial-key pad 16, an handset 17, a speaker 18, and a liquid-crystal display (LCD) 46. The LEDs 14 are provided for the extension key switches 15b, respectively. The liquid-crystal display 46 is used as a character display.

The controller 5a comprises a control-signal interface circuit 6, a CPU 9, an LED controller 10, a key switch controller 11, a speech controller 12, a handset controller 13, an LCD controller 41, a power unit 42, a transformer 43, a modular connector 44, and a memory unit 70.

The control-signal interface circuit 6 is connected to the line L by the transformer 43 and the modular connector 44; it is thus connected to the electronic exchange 1a. The interface circuit 6 is designed to receive control signals from the exchange 1a, and to supply control signals to the exchange 1a.

The CPU 9 (hereinafter called "terminal CPU") is the main component of the controller 5a, for controlling the attendant. The terminal CPU 9 controls the attendant in accordance with the data stored in the memory unit 70.

The memory unit 70 comprises at least a ROM and a RAM. The ROM stores an initial program loader (IPL) program. When the attendant is initialized, the terminal CPU 9 automatically executes the IPL program, thus receiving the key-assign data from the electronic exchange 1a and writing this data into the ROM of the memory unit 70.

The LED controller 10 is designed to drive the LEDs 14 of the attendant, which are provided for the response switch (not shown in FIG. 1 or 2), the call-mode response key 15a, and the extension key switches 15b, respectively. The key switch controller 11 is designed to detect which key or key switch, i.e., the response key switch (not shown), the call-mode response key 15a, or one of the extension key switches 15b, has been pushed. The speech controller 12 is used to supply a ringing signal or a speech signal to the speaker 18 of the attendant and also to the handset controller 13, and to supply the electronic exchange (not shown) with the speech signals generated by the handset 17.

The LCD controller 41 is designed to drive the liquid-crystal display 46 (i.e., the character display) in accordance with the display data and the control signal, both transmitted from the terminal CPU 9.

The modular connector 44 connects the line L and the attendant. It is coupled by the transformer 43 to the control-signal interface circuit 6. The transformer 43 separates the signal component and the DC voltage component (about 20 V) from each other, which are supplied together through the line L.

The power unit 42 converts the DC voltage applied through the line L, into a predetermined voltage which is required to drive the other components of the attendant. It should be noted that the power unit 42 can be dispensed with.

A power switch 45 is connected to the power unit 42. When the power switch 45 is closed, the attendant including the controller 5a is turned on. When the switch 45 is opened, the attendant is turned off.

FIG. 2 is a plan view of the attendant. The LEDs 14, the call-mode response key 15a, the extension key switches 15b, the dial-key pad 16, the handset 17, the speaker 18, and the liquid-crystal display 46, are arranged on an operation panel.

FIG. 3 is a diagram showing the memory map of the memory unit 20 incorporated in the electronic exchange 1a. As can be clearly understood from this figure, the memory unit 20 comprises an exchange-control program area 20a, a fixed data area 20b, and a work area 20d. A key-assign data area 20c is included in the work area 20d, and not in the fixed data area 20b, as in the corresponding memory unit incorporated in the conventional electronic exchange system. Hence, the key-assign data stored in the data area 20c can be altered whenever necessary.

FIG. 4 is a diagram illustrating the memory map of the memory unit 70 used in the controller 5a. As is evident from this figure, the unit 70 comprises a terminal-control program area 70a and a work area 70c. A key-assign data area 70b is included in the work area 70c. Thus, the key-assign data stored in the data area 70b can also be altered whenever required.

The key-assign data stored in the data area 70b consists of the codes of the extension key switches 15b. When any one of the key switches 15b is pushed, the key switch controller 11 detects this and supplies a detection signal to the terminal CPU 9. In response to this signal, the terminal CPU 9 reads the code of the pushed key switch and supplies the key code to the electronic exchange 1a via the control-signal interface circuit 6, the transformer 43, and the modular connector 44.

FIG. 10 is a block diagram schematically showing the structure of the terminal CPU 9 incorporated in the controller 5a. FIG. 11 is a block diagram, too, schematically illustrating the structure of the CPU 3 incorporated in the electronic exchange 1a.

As is illustrated in FIG. 10, the terminal CPU 9 comprises a first control unit 9a and a second control unit 9b. The first control unit 9a is designed to initialize the attendant, to start waiting for any key code upon initializing the attendant, and to store a key code into the key-assigned data area 70b of the memory unit 70, upon receiving this code from the attendant. The second control unit 9b reads any key code from the data area 70b and supplies this key code to the electronic exchange (not shown), upon receipt of the detection signal which is transmitted from the key switch controller 11 and which shows that any one of the extension key switches 15b of the attendant has just been pushed.

As is shown in FIG. 11, the CPU 3 of the electronic exchange 1a comprises a function-registering control unit 3a, a key-code transfer unit 3b, and a function-performing unit 3c. The function-registering unit 3a is designed to register the key code identifying each key switch 15b and the data item representing the function to which the key switch is assigned, in the key-assign data area 20c of the memory unit 20. The key-code transfer unit 3b is designed to determine whether or not the attendant is connected to the exchange 1a, to read the key codes from the memory unit 20 when it determines that the attendant is coupled to the exchange 1a, and to transfer the key codes to the control-signal way interface 4. The function-performing unit 3c is designed to identify, based on any key code transmitted from the controller 5a, the function to which the key switch represented by the key code, and then to perform the function thus identified.

In summary, the memory unit 20 of the exchange 1a stores the codes of the key switches 15b of the attendant, and also the data items showing the functions to which the key switches are assigned. The key codes, i.e. key-assign data, are read from the memory unit 20, transmitted to the controller 5a, and stored into the memory unit 70. When any one of the key switches 15b of the attendant is pushed, the code of this key switch is read from the memory unit 70 and is transferred to the electronic exchange 1a. In the exchange 1a, the function, to which the pushed key switch is assigned, is identified by the key code and the corresponding function data item stored in the memory unit 20. The CUP 3 of the exchange 1a performs the function thus identified.

It will now be described how the electronic exchange system described above operates, with reference to the diagram of FIG. 5.

First, the power supply to the controller 5a is turned ON at time T11, thus activating the controller 5a. Then, the terminal CPU 9 starts executing the IPL (Initial Program Loader) program at time T12. Next, at time T13, the control-signal interface circuit 6 of the controller 5a supplies a start report signal to the control-signal way interface 4 of the electronic exchange 1a through the line L. The start report signal contains various codes, a data item showing the number of function keys, a data item representing the type of a terminal, and the like. The start report signal is further transmitted from the control-signal way interface 4 to the CPU 3 at time T14. Upon receipt of this signal, the CPU 3 reads the key-assign data from the memory unit 20 and supplies it to the controller 5a at time T15. The key-assign data is transmitted to the terminal CPU 9 through the control-signal interface circuit 6. At time T16, the terminal CPU 9 writes the key-assign data into the key-assign data area 70b, which is included in the work area 70c of the memory unit 70.

Thereafter, at time T17, the terminal CPU 9 outputs a key-assign data receive report signal to the electronic exchange 1a. In response to this report signal, the CPU 3 of the exchange 1a outputs a terminal-processing start report signal to the controller 5a at time T18. Then, the CPU 3 starts controlling the electronic exchange at time T19. The terminal-processing start report signal is transmitted to the terminal CPU 9 through the control-signal way interface 4, the line L, and the control-signal interface circuit 6. As soon as the terminal CPU 9 receives this report signal, the terminal CPU 9 begins to control the attendant at time T20.

The operation of the electronic exchange system will be explained in greater detail, with reference to the flow chart of FIG. 6.

First, it will be explained how the exchange 1a operates. The exchange 1a controls the electronic exchange (i.e., the PBX) in step ST1. While the exchange 1a is controlling the electronic exchange, the CPU 3 determines, at step ST2, whether or not a start report signal, generated at time T13, has been received from the controller 5a. If NO in step ST2, that is, if the attendant (i.e., the terminal) has not been connected to the electronic exchange, the operation of the electronic exchange 1a goes to step ST8. In step ST8, the exchange 1a continues to control the electronic exchange. If YES in step ST2, that is, if the attendant has been connected to the electronic exchange, the operation of the exchange 1a goes to step ST3. In step ST3, the CPU 3 reads the key-assign data from the memory unit 20 and supplies this data to the controller 5a at time T15. Then, the exchange 1a waits for a key-assign data receive report signal. In step ST4, the CPU 3 determines whether or not a key-assign data receive report signal has been received. If NO, the operation goes to step ST7, in which the CPU 3 determines whether or not the count of the timer incorporated in the electronic exchange 1a has reached a preset value. If YES in step ST7, the operation goes to step ST8, whereby the exchange 1a continues to control the electronic exchange. If NO in step ST7, the exchange 1a keeps waiting for a key-assign data receive report signal. If YES in step ST4, that is, if the CPU 3 determines that the exchange 1a has received a key-assign data receive report signal, generated at time T17, from the controller 5a, the operation of the exchange 1a goes to step ST5. In step ST5, the CPU 3 registers the data item representing connection of the attendant to the electronic the exchange 1a. Then, in step ST6, the CPU 3 supplies a terminal-processing start report signal to the controller 5a at time T18. Further, in step ST8, the electronic exchange 1a continues to control the electronic exchange.

It will now be explained how the controller 5a operates. First, the attendant and the controller 5a are turned on, by closing the power switch 45. (As has been pointed out, the switch 45 can be dispensed with, in which case the attendant and the controller 5a are turned on when the modular connector 44 is connected to the line L.) Then, the power unit 42 converts the DC voltage applied from the power supply 33 incorporated in the electronic exchange 1a, to a voltage required in both the attendant and the controller 5a. The power unit 42 applies this voltage to the other components of the attendant, in step ST11.

Also at step ST11, the terminal CPU 9 of the controller 5a executes the IPL program stored in the memory unit 70. The attendant and also the controller 5a are thereby initialized in step ST12. The operation of the controller 5a goes to step ST13. In step ST13, the controller 5a supplies a start report signal to the electronic exchange 1a. Then, in step ST14, the terminal CPU 9 determines whether or not the controller 5a has received key-assign data from the electronic exchange 1a. If NO, the operation returns to step ST14. If YES, that is, the controller 5a has received the key-assign data, the operation goes to the next step, ST15. In step ST15, the terminal CPU 9 stores the key-assign data into the memory unit 70. Then, in step ST16, the terminal CPU 9 supplies a key-assign data received report signal to the electronic exchange 1a. Thereafter, in step ST17, the terminal CPU 9 determines whether or not the controller 5a has received a terminal-processing start report signal from the electronic exchange 1a. If NO in step ST17, the terminal CPU 9 repeatedly performs step ST17 until a predetermined time elapse. Upon elapse of the predetermined time, the terminal CPU 9 resets the attendant and also the controller 5a, whereby the sequence of steps ST11 to ST17 is repeated. IF YES in step ST17, that is, if the controller 5a has received a terminal-processing start report, the operation goes to step ST18. In step ST18, the controller 5a controls the attendant.

Thus, the electronic exchange (i.e., the PBX) can operate in concert with the attendant (i.e., the terminal), and the attendant can perform its function.

It will now be explained how the electronic exchange 1a and the controller 5a operate to respond any call coming through the office line.

Upon receipt of a call transmitted from the office line, the exchange 1a supplies a ringing signal to the controller 5a. In response to the ringing signal, the terminal CPU 9 causes the speech controller 12 to generate a drive signal. The drive signal is supplied to the loudspeaker 18 of the attendant, whereby the loudspeaker 18 gives forth an alarm. Hearing this alarm, the operator at the attendant pushes the response switch (not shown) or the call-mode response key 15a. When the call-mode response key 15a is pushed, the key switch controller 11 outputs a signal, which is supplied to the terminal CPU 9. The CPU 9 identifies the code of the pushed key from the key-assign data stored in the key-assign data area 70b which is part of the terminal-control program area 70a of the memory unit 70. If the terminal CPU 9 determines that the pushes key is the call-mode response key 15a based on the key code thus identified, it causes the LED controller 10 to turn on the LED 14a which is located near the call-mode response key 15a, as illustrated in FIG. 2.

The call-mode response key 15a is a push button which the operator pushes while the LED 14a is on, whereby the attendant receives a call reading the attendant.

The response switch (not shown) is a push button the operator pushes when the attendant is receiving two or more calls simultaneously from the electronic exchange 1a, in order to select one of those calls which has the highest priority.

If the operator pushes the call-mode response key 15a while the LED 14a is off, the terminal CPU 9 does nothing at all. While the LED 14a is on, the terminal CPU 9 enables the speech controller 12 to communicate with the handset 17 through the handset controller 13. The operator can therefore talk with the caller on the other side of the office line. He or she asks whom the caller wishes to talk, and then pushes the extension kay switch 15b assigned to the extension line connected to the telephone of the called person. When the operator pushes call-mode response key 15a while the LED 14a is on, the terminal CPU 9 reads the code of the depressed key switch from the key-assign data area 70b of the memory unit 70, and supplies this code to the electronic exchange 1a. At the same time, the CPU 9 causes the speech controller 12 to drive the loudspeaker 18. The loudspeaker 18 thereby generates an alarm, informing the operator that the controller 5a has responded to his or her pushing the extension key switch 15b.

Upon receipt of the key code from the controller 5a, the CPU 3 of the exchange 1a compares the key code with those stored in the key-assign data area 20c of the memory unit 20, thereby to determine which key switch the operator has pushed. If the CPU 3 determines that the the response key switch (not shown) has been depressed, it immediately supplies a ringing-stop signal and a talk-start signal to the controller 5a. In response to the ringing-stop signal, the terminal CPU 9 causes the speech controller 12 to stop driving the loudspeaker 18. Hence, the loudspeaker 18 stops generating an alarm. In response to the talk-start signal, the terminal CPU 9 controls the speech controller 12, such that the operator can talk with the called person.

The operator tells the called person that the caller want to talk with him or her. Then, the operator pushes the response key switch (not shown) or the call-mode response key 15a. As soon as the response key switch or the call-mode response key 15a is pushed, the electronic exchange 1a connects the office line to the extension line. As a result, the caller and the called person can talk with each other.

As may be understood from the above, it is CPU 3 that executes a control program, thus controlling all components, but itself, of the electronic exchange 1a. It is the terminal CPU 9 that executes a control program, thus controlling the attendant, as well as all components, but itself, of the controller 5a. Further, when the attendant is initialized, the exchange 1a automatically assigns the response key switch (not shown), the call-mode response key 15a and the extension key switches 15b to various functions, and the key-assign data (i.e., key codes) stored in the memory unit 20 is written into the memory unit 70 of the controller 5a.

Therefore, with the electronic exchange system of this invention, the key assignment can be altered by changing only the key-assign data stored in the electronic exchange 1a, unlike in the conventional system, wherein the operator must change not only the program stored in the exchange 1a, but also the program stored in the attendant to alter the key assignment. It is therefore relatively easy for the operator to assign the response key switch (not shown), the call-mode response key 15a and the extension key switches 15b to various functions in such a way, that he or she can more accurately and quickly operate the key-switch board.

Figure 7:
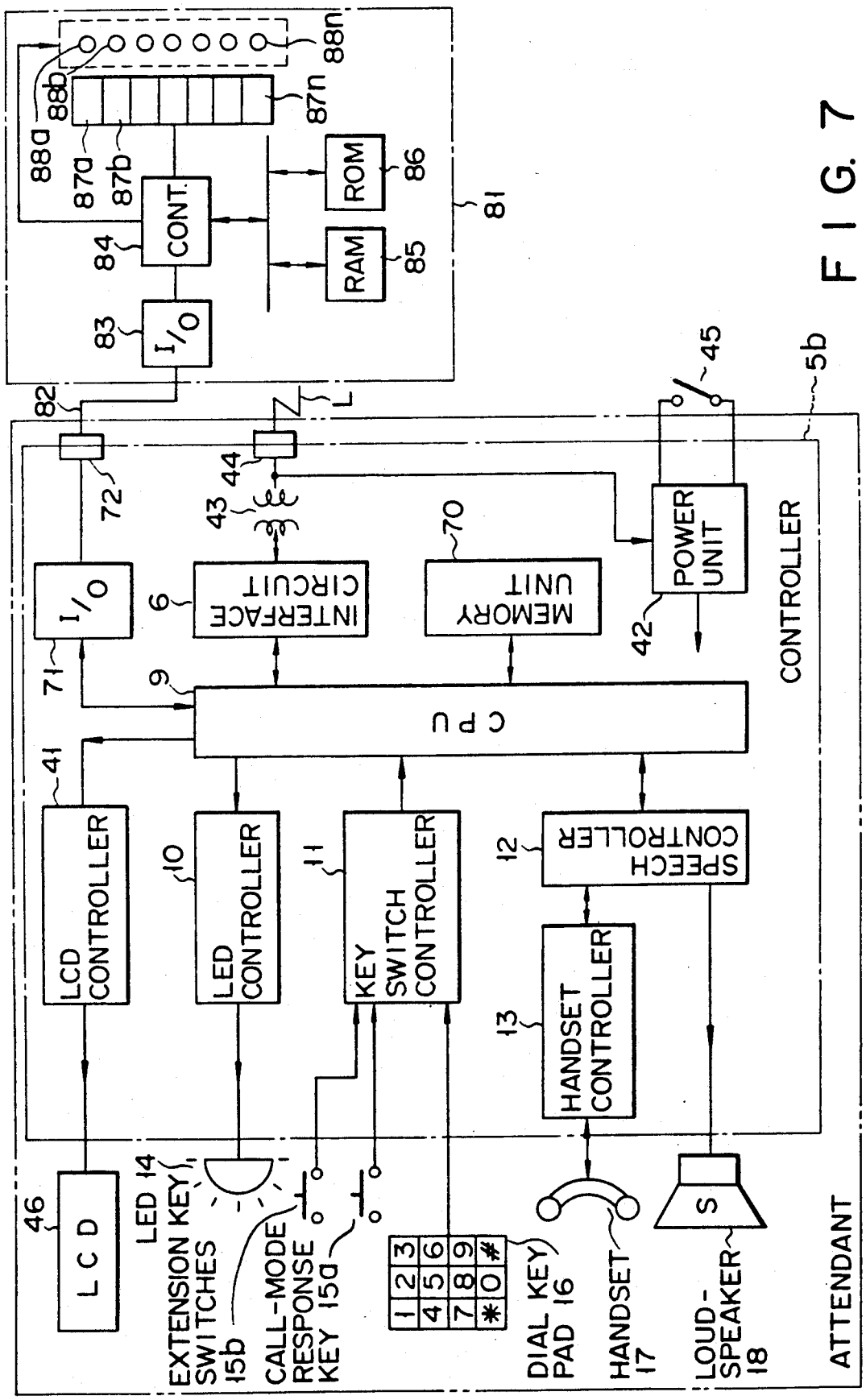
FIG. 7 is a block diagram showing an electronic exchange system according to a second embodiment of the present invention.
Figure 8:
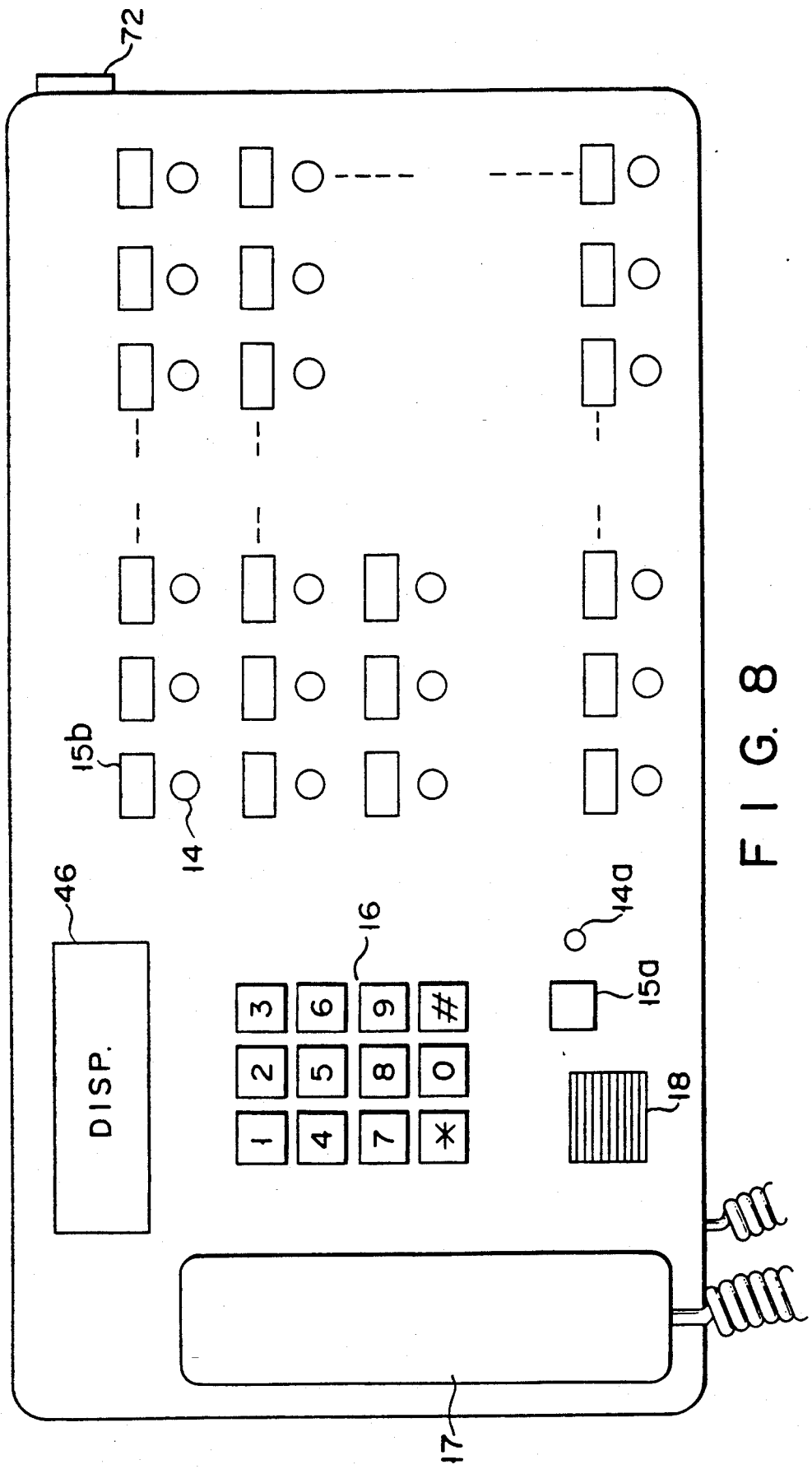
FIG. 8 is a plan view illustrating the outer appearance of the attendant incorporated in the system shown in FIG. 7.

A second embodiment of the present invention will now be described, with reference to FIGS. 7 and 8. FIG. 7 is a block diagram showing an electronic exchange system, and FIG. 8 is a plan view showing the outer appearance of the attendant incorporated in the system. As is clearly seen from FIG. 7, the system differs from the system illustrated in FIG. 1 in that an extension keyboard unit 81 is provided which can be connected to the controller 5b incorporated in an attendant.

The controller 5b is identical to the controller 5a shown in FIG. 1, except that it has an I/O interface 71 and a connector 72 connected to the I/O interface 71. The I/O interface 71 is coupled to the terminal CPU 9. The terminal CPU 9 controls the other components of the controller 5b. The CPU 9 detects the signal output from the I/O interface 71, thereby to monitor the condition of the I/O interface 71. Also, it encodes the signals output from the I/O interface 71 and supplies the signals, thus encoded, to an electronic exchange 1a (not shown), and generates specified data items assigned to the indicator lamps (later described) of the extension keyboard unit 81 and also on/off signals for turning on or on the indicator lamps.

As is evident from FIG. 7, the extension keyboard unit 81 comprises a cable 82, an I/O interface 83, a controller 84, a RAM 85, a ROM 86, a plurality of key switches 87a to 87n, and LEDs 88a to 88n (i.e., indicator lamps 88a to 88n). The cable 82 connects the I/O interface 83 to the connector 72 of the controller 5b.

Hence, the I/O interface 83 can receive signals from, and supply signals to, the controller 5b. The controller 84 controls the I/O interface 83, determines which key switch has been depressed, and turns on and off the LEDs 88a to 88n. The ROM 86 stores an IPL (Initial Program Load) program and a control program which the controller 84 will execute to perform the functions just mentioned. The RAM 85 provides a work area for the controller 84 and is used to store data temporarily. The LEDs 88a to 88n are located near the key switches 87a to 87n.

Electric power is supplied from the controller 5b to the extension keyboard unit 81 through the cable 82 connected to the connector 72. The controller 5b is designed such that electrical power is supplied to the connector 72.

When power is supplied from the controller 5b to the extension keyboard unit 81 through the cable 82, the controller 84 executes the IPL program stored in the ROM 86, and thus makes a cold start. Then, the controller 84 executes the control program stored in the ROM 86, thus performing various operations. First, it supplies a start signal to the I/O interface 83. Next, it saves key-assign data into the RAM 85 when it receives this data from the controller 5b via the I/O interface 83. Further, in response to a start signal transmitted from the controller 5b through the I/O interface 83, the controller 84 determines which key switch has been depressed. Then, the controller 84 reads the code of the key depressed, from the RAM 85, and outputs this key code, thereby turning on the indicator lamp arranged near the depressed key.

The memory unit 20 of the exchange 1a stores the codes of the key switches 87a to 87n and also the data items representing the functions to which the key switches 87a to 87n are assigned. These codes and the data items are automatically stored into the memory unit 70 of the controller 5b when the controller 5b is connected to the exchange 1a. Further, they are automatically read from the memory unit 70 and stored into the RAM 85 of the keyboard 81 when the extension keyboard 81 is connected to the controller 5b.

FIG. 12 is a block diagram illustrating the CPU 9 (hereinafter called "terminal CPU") incorporated in the controller 5b. FIG. 13 is a block diagram showing the controller 84 used in the extension keyboard unit 81.

As shown in FIG. 12, the terminal CPU 9 comprises three control units 9a, 9b, and 9c. The first control unit 9a is designed to initialize the attendant, to start waiting for any key code upon initializing the attendant, and to store a key code into the memory unit 70, upon receiving this code from the attendant. The second control unit 9b is designed to read any key code from the memory unit 70 and supply this key code to the extension keyboard unit 81 connected to the controller 5b. The third control unit 9c is designed to read, from the memory unit 70, the key code of any key switch of the attendant that has been operated and then supply this key code to the exchange 1a, and also to read, from the memory unit 70, the key code of any key switch of the extension keyboard unit 81 that has been depressed and then supply this key code to the exchange 1a.

As is illustrated in FIG. 13, the controller 84 comprises a memory control unit 84a, a key-code transfer control unit 84b, and a lamp control unit 84c. The memory control unit 84a is designed to receive a key code transmitted from the controller 5b and write this code into the RAM 85. The key-code transfer control unit 84b is designed to determine any switch key of the extension keyboard unit 81 that has been depressed, to read the key code of the depressed key from the RAM 85, and to transfer this key code to the controller 5b through the I/O interface 83. The lamp control unit 84c is designed to receive an LED-driving data item from the controller 5b and turn on the LED designated by this data item.

FIG. 14 is a block diagram showing the structure of the CPU 3 incorporated in the electronic exchange 1a (not shown in FIG. 7). As is evident from this figure, the CPU 3 comprises a function-registering control unit 3a, a key-code transfer unit 3b, and a function-performing unit 3c. The function-registering unit 3a is designed to register, in the memory unit 20 of the exchange 1a, the key codes identifying the key switches 15a and 15b of the attendant and those identifying the key switches 87a to 87n of the extension keyboard unit 81, and also the data items representing the functions to which the response key switch (not shown in FIG. 7 or 8), the call-mode response key 15a, the extension key switches 15b, and the key switches 87a to 87n are assigned. The key-code transfer unit 3b is designed to determine whether or not the attendant and the extension keyboard unit 81 are connected to the electronic exchange 1a, to read the key codes from the memory unit 20 when it determines that the attendant and the extension keyboard unit 81 are both connected to the exchange 1a, and to transfer the key codes to the controller 5b an also to the extension keyboard unit 81. The function-performing unit 3c is designed to identify, based on any key codes transmitted from the controller 5b and the extension keyboard unit 81, the functions to which the key switches represented by the key codes, and then to perform the functions thus identified.

In summary, the memory unit 20 of the electronic exchange 1a stores the codes of the key switches of both the attendant and the extension keyboard unit 81, and also the data items showing the functions to which the key switches are assigned. Hence, when the attendant and the extension keyboard unit 81 are connected to the exchange 1a, the key-assign data, i.e., key codes stored in the memory unit 20, are transmitted to the controller 5b and also to the extension key board unit 81, and are stored into the memory unit 70 of the controller 5b and the RAM 85 of the keyboard unit 81. When any one of the key switches 15a, 15b and 87a to 87n is depressed, the code of this key switch is read from the memory unit 70 or the RAM 85 and is transferred to the electronic exchange 1a. In the exchange 1a, the function, to which the pushed key switch is assigned, is identified by the key code and the corresponding function data item stored in the memory unit 20. The CPU 3 of the exchange 1a performs the function thus identified.

It will now be described how the electronic exchange system shown in FIGS. 7 and 8 operates.

The memory unit 20 of the electronic exchange 1a stores programs and data which are required for controlling the attendant and the extension keyboard unit 81. When the CPU 3 determines that the attendant is connected to the electronic exchange (not shown), it reads the programs and the data from the memory unit 20 and supplies them to the controller 5b. The data transmitted to the controller 5b includes the key-assign data representing the response key switch (not shown), the call-mode response key 15a and the extension key switches 15b of the attendant, and also the key-assign data representing the key switches 87a to 87n of the extension keyboard unit 81.

When the extension keyboard unit 81 is connected to the controller 5b which is off, and electric power is supplied to the controller 5b, the terminal CPU 9 executes the IPL program stored in the memory unit 70, and generates a start report signal. This signal is transmitted to the electronic exchange 1a through the control-signal interface circuit 6 and the line L. The start report signal contains key codes, a data item showing the number of function keys, and a data item representing the type of the attendant.

In the electronic exchange 1a, the start report signal is transmitted to the CPU 3 through the control-signal way interface 4. In response to the start report signal, the CPU 3 reads the key-assign data from the memory unit 20 and supplies this data to the controller 5b.

In the controller 5b, the key-assign data is transmitted to the terminal CPU 9 through the control-signal interface circuit 6. The terminal CPU 9 writes the data into the key-assign data area 70b, which is part of the work area 70c of the memory unit 70. Then, the terminal CPU 9 determines whether or not the controller 5b has received a setting-start signal from the extension keyboard unit 81. If it determines that the controller 5b has received a setting-start signal, the terminal CPU 9 supplies a function-altering signal to the electronic exchange 1a, and supplies the key-assign data representing the key switches 87a to 87n, to the controller 84 through the I/O interface 71 and the I/O interface 83. Thereafter, the terminal CPU 9 supplies a key-assign data receive report signal to the electronic exchange 1a.

In the meantime, upon receipt of the function-altering signal from the terminal CPU 9, the CPU 3 of the exchange 1a alters the assignment of functions to the key switches, so that the extension keyboard unit 81 connected to the controller 5b can operate. Upon receipt of the key-assign data receive report signal transmitted from the controller 5b, the CPU 3 supplies a terminal-processing start report signal to the controller 5b, and starts controlling the electronic exchange (not shown). The terminal-processing start report signal is transmitted to the terminal CPU 9 through the control-signal way interface 4, the line L, and the control-signal interface circuit 6. In response to this report signal, the terminal CPU 9 starts controlling the attendant.

In the meantime, when power is supplied to the extension keyboard unit 81, the controller 84 supplies a setting-start signal to the controller 5b, saves in the RAM 85 the key-assign data transmitted from the controller 5b, and starts controlling the other components of the extension keyboard unit 81.

The operation of the electronic exchange system illustrated in FIGS. 7 and 8 will be explained in greater detail, with reference to the flow chart of FIG. 9.

First, it will be explained how the electronic exchange 1a operates. When the power is supplied to the exchange 1a, the exchange 1a starts controlling the electronic exchange (i.e., the PBX) in step ST1. While the exchange 1a is performing telephone exchanging, the CPU 3 determines, at step ST2, whether or not a start report signal, generated at time T13 (FIG. 5), has been received from the controller 5b. If NO in step ST2, that is, if the attendant has not been connected to the electronic exchange 1a, the operation of the electronic exchange 1a goes to steps ST8. In step ST8, the exchange 1a continues to control the electronic exchange. If YES in step ST2, that is, if the attendant has been connected to the exchange 1a, the operation of the exchange 1a goes to step ST3. In step ST3, the CPU 3 read the key-assign data from the memory unit 20 and supplies this data to the controller 5b at time T15 (FIG. 5). The key-assign data represents not only the codes of the response key switch (not shown), the call-mode response key 15a and the extension key switches 15b of the controller 5b, but also the codes of the key switches 87a to 87n of the extension keyboard unit 81. The key-assign data has been input to the memory unit 20 by operating the keyboard of a terminal connected to the exchange 1a.

Then, in step ST31, the CPU 3 of the electronic exchange 1a determines whether or not the exchange 1a has received a function-altering signal. If YES, the CPU 3 determines that the extension keyboard unit 81, as well as the controller 5b, is connected to the exchange 1a. In this case, the operation goes to step ST32. In step ST32, the CPU 3 starts controlling not only the controller 5b, but also the extension keyboard unit 81.

Figure 5:
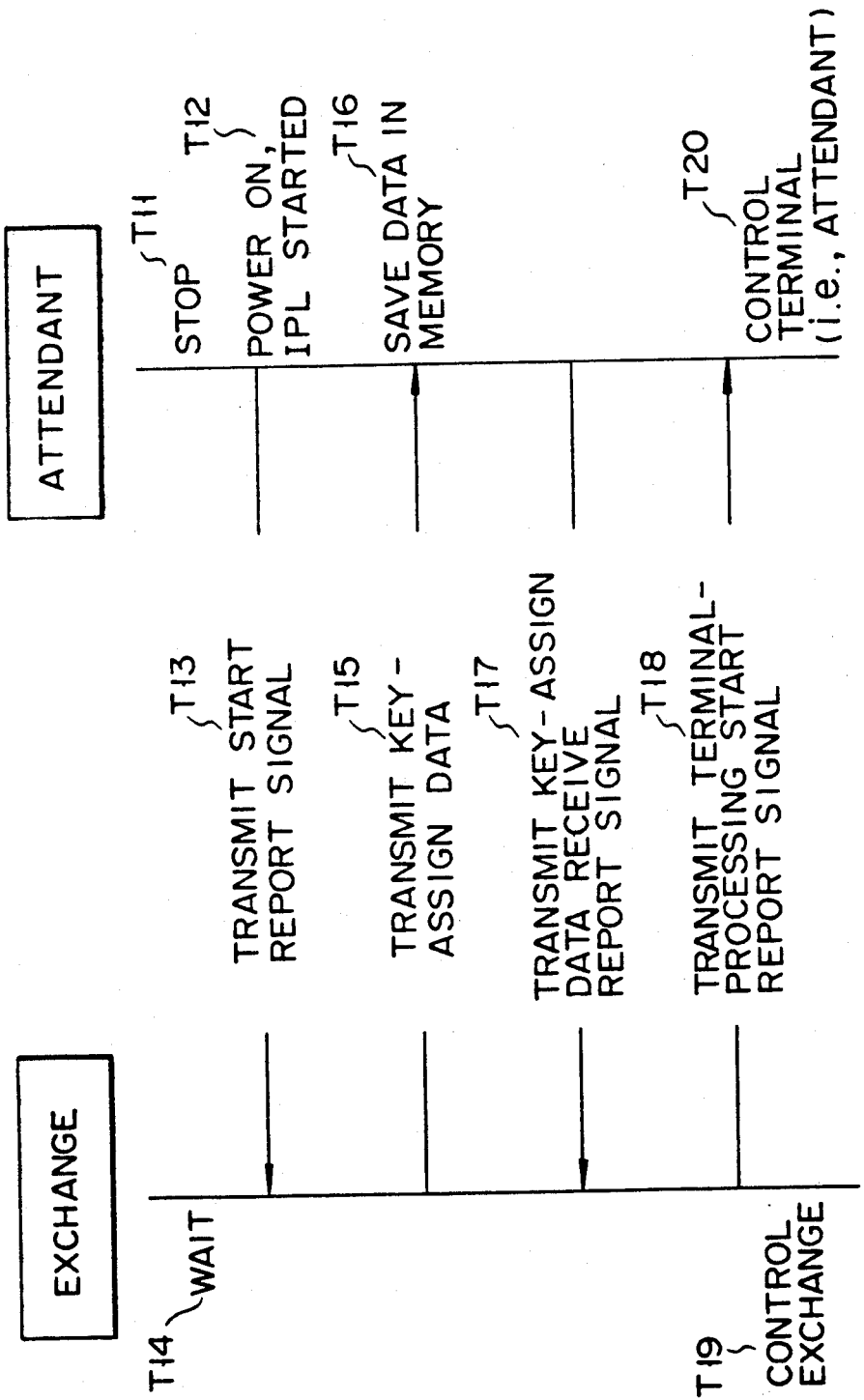
FIG. 5 is a diagram explaining how various operations are sequentially performed in the system shown in FIGS. 1 and 2.

If NO in step ST31, the operation goes to step ST4, in which the CPU 3 determines whether or not the exchange 1a has receives a key-assign data receive report signal generated at time T17 (FIG. 5). If NO, the operation goes to step ST7, in which the CPU 3 determines whether or not the count of the timer incorporated in the exchange 1a has reached a preset value. If YES in step ST7, the operation goes to step ST8, whereby the CPU 3 determines that the attendant is not connected to the exchange 1a, and stores the data showing this face into the memory unit 20. In this case, the exchange 1a continues to control the electronic exchange. If NO in step ST7, the operation returns to step ST4. If YES in step ST4, the CPU 3 stores the data showing that the attendant is connected to the exchange 1a, into the memory unit 20. Then, the operation goes to step ST6 and step ST8, in which the exchange 1a performs ordinary telephone exchanging.

If YES in step ST4, that is, if the CPU 3 determines that the exchange 1a has receives a key-assign data receive report signal, generated at time T17 (FIG. 5), from the controller 5b, the operation of the exchange 1a goes to step ST5. In step ST5, the CPU 3 registers the data item representing the connection of the attendant to the exchange 1a. In the next step, step ST6, the CPU 3 supplies a terminal-processing start report signal to the controller 5b at time T18 (FIG. 5). Further, in step ST8, the exchange 1a starts controlling the electronic exchange again.

It will now be explained how the controller 5b operates. First, the attendant and the controller 5b are turned on, by closing the power switch 45. (As has been pointed out, the switch 45 can be dispensed with, in which case the attendant and the controller 5b are turned on when the connector 44 is connected to the line L.) Then, the power unit 42 converts the DC voltage applied from the power supply 33 incorporated in the electronic exchange 1a, to a voltage required in both the attendant and the controller 5b. The power unit 42 applies this voltage to the components of the attendant and those of the controller 5b, at step ST11.

Also at step ST11, the terminal CPU 9 of the controller 5b executes the IPL program stored in the memory unit 70. The attendant and also the controller 5b are thereby initialized in step ST12. The flow then advances to step ST13, in which the controller 5b supplies a start report signal to the electronic exchange 1a. Then, in step ST14, the terminal CPU 9 determines whether or not the controller 5b has received key-assign data from the electronic exchange 1a. If NO, the operation returns to step ST14. If YES, that is, the controller 5b has received the key-assign data, the flow goes to the next step, ST15. In step ST15, the terminal CPU 9 stores the key-assign data into the memory unit 70.

Figure 6:
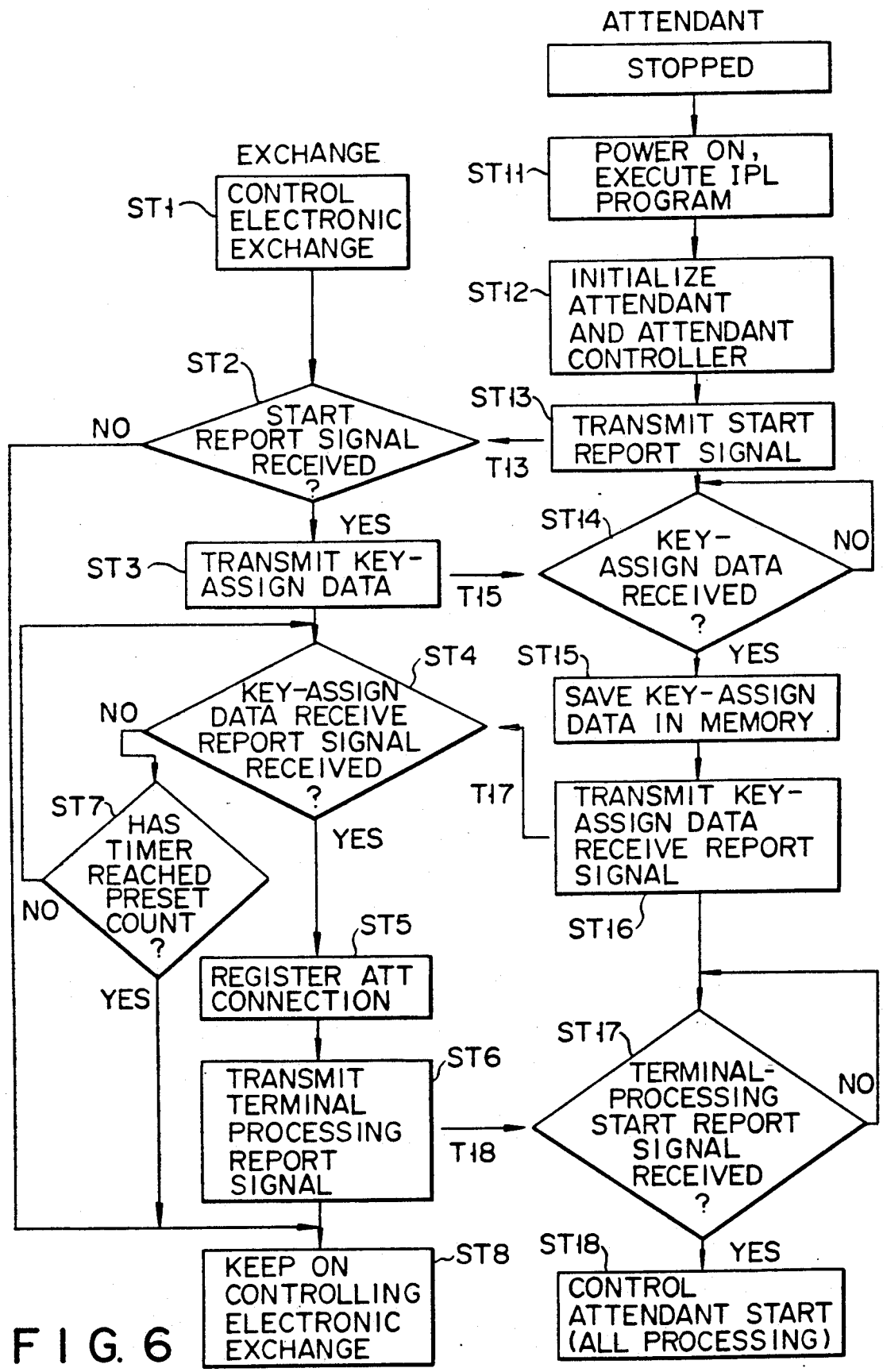
FIG. 6 is a flow chart explaining how the system of FIGS. 1 and 2 operates.

In the first embodiment shown in FIGS. 1 and 2, the operation then advances to step ST16, as is illustrated in the flow chart of FIG. 6. In step ST16, the terminal CPU 9 supplies the key-assign data received report signal to the exchange 1a. Thereafter, in step ST17, the terminal CPU 9 determines whether or not the controller 5b has received a terminal-processing start report signal from the exchange 1a. If YES in step ST17, the controller 5b starts controlling the attendant.

In contrast, in the second embodiment shown in FIGS. 7 and 8, steps ST41 to ST44 are executed after step ST15 since the extension keyboard unit 81 is connected to the controller 5b.

More specifically, after the terminal CPU 9 stores the key-assign data into the memory unit 70 in step ST15, it determines in step ST41 whether or not the controller 5b has receives a setting-start signal from the extension keyboard unit 81. If NO, the operation goes to step ST16, in which the CPU 9 outputs a key-assign data received report signal to the electronic exchange 1a. In the next step ST17, the terminal CPU 9 determines whether or not the controller 5b has receives a terminal-processing start report signal from the electronic exchange 1a. If NO in step ST17, the CPU 9 repeats step ST17 until it determines that the controller 5b has receives a terminal-processing start report signal. If YES in step ST17, the operation goes to step ST44. In step ST44, the terminal CPU 9 outputs a start signal to the external keyboard unit 81. Then, in step ST18, the controller 5b controls the attendant.

If YES in step ST41, that is, if the controller 5b has receives a setting-start signal, the operation goes to step ST42. In step ST42, the terminal CPU 9 outputs a function-altering signal to the electronic exchange 1a. In the next step, ST43, the terminal CPU 9 supplies the key-assign data to the extension keyboard unit 81. Then, the flow advances to step ST16, in which the CPU 9 supplies a key-assign data receive report signal to the electronic exchange 1a. Next, in step ST17, the controller 5b waits for a terminal-processing start report signal transmitted from the electronic exchange 1a. Upon receipt of this report signal, the terminal CPU 9 outputs a start signal to the extension keyboard unit 81 in step ST44. Thereafter, in step ST18, the controller 5b starts controlling the other components of the attendant.

Needless to say, the CPU 9 can execute the step ST41 at any time desired, to determine whether or not the extension keyboard 81 is connected to the attendant. If it is determined that the keyboard 81 has been connected to the attendant, the steps ST42, ST16, ST17, and ST44 can be executed, so that the extension keyboard 81 can be used.

It will now be explained how the extension keyboard unit 81 operates, also with reference to FIGS. 9A and 9B. When the cable 82 is connected to the controller 5b, the keyboard unit 81 is turned on in step ST51. Also in step ST51, the controller 84 executes the IPL program stored in the ROM 86. In step ST52, the controller 84 supplies a setting-start signal via the I/O interface 83 to the controller 5b. Then, the operation goes to step ST53. In this step, the controller 84 receives the key-assign data from the controller 5b and saves this data into the RAM 85. In the next step, ST53, the controller 84 receives the start signal from the controller 5b, whereby the key switches 87a to 88n can be operated. When the operator pushes any of these keys, the controller 84 supplies the key code assigned to the pushed key, which is part of the key-assign data saved in the RAM 85, to the controller 5b. Also, the controller 84 turns on or off the LEDs 88a to 88n in accordance with the LED-driving data items transmitted from the controller 5b.

As has been explained, various signals are exchanged between the electronic exchange 1a and the controller 5b. It will be described, in more detail, when these signals are exchanged, and how.

Upon receipt of a call transmitted from the office line, the exchange 1a supplies a ringing signal to the controller 5b. In the controller 5b, the terminal CPU 9 causes the speech controller 12 to generates a drive signal, upon receipt of the ringing signal. The drive signal is transmitted to the loudspeaker 18 of the attendant, whereby the loudspeaker 18 gives forth an alarm. Hearing this alarm, the operator pushes the response key switch (not shown) or the call-mode response key 15a. When the response key switch (now shown) or the response key 15a is pushed, the key switch controller 11 outputs a signal, which is transmitted to the terminal CPU 9. The CPU 9 identifies the code of the pushed key from the key-assign data stored in the key-assign data area 70b which is part of the terminal-control program area 70a of the memory unit 70. If the terminal CPU 9 determines that the pushed key is the call-mode response key 15a based on the key code thus identified, it causes the LED controller 10 to turn on the LED 14a which is located near the response key 15a, as illustrated in FIG. 2.

If the operator pushes the call-mode response key 15a while the LED 14a is off, the terminal CPU 9 does nothing at all. While the LED 14a is on, the terminal CPU 9 enables the speech controller 12 to communicate with the handset 17 through the handset controller 13. The operator can therefore talk with the caller on the other side of the office line. He or she asks whom the caller wishes to talk with, and then pushes the extension key switch 15b assigned to the extension line connected to the telephone of the called person. When the operator pushes the call-mode response key switch 15a while the LED 14a is on, the terminal CPU 9 reads the code of the depressed key switch from the key-assign data area 70b of the memory unit 70, and supplies this code to the exchange 1a. At the same time, the CPU 9 causes the speech controller 12 to drive the loudspeaker 18. The loudspeaker 18 thereby generates an alarm, informing the operator that the controller 5a has responded to his or her pushing the extension key switch 15b.

Upon receipt of the key code from the controller 5a, the CPU 3 of the electronic exchange 1a compares the key code with those stored in the key-assign data area 20c of the memory unit 20, thereby to determine which key switch the operator has pushed. If the CPU 3 determines that the response key switch (not shown) has been depressed, it immediately supplies a ringing-stop signal and a talk-start signal to the controller 5a. In response to the ringing-stop signal, the terminal CPU 9 causes the speech controller 12 to stop driving the loudspeaker 18. Hence, the loudspeaker 18 stops generating an alarm. In response to the talk-start signal, the terminal CPU 9 controls the speech controller 12, such that the operator can talk with the called person.

The operator tells the called person that the caller want to talk with him or her. Then, the operator places the handset 17 back on to the cradle. As soon as the handset 17 is placed on the cradle, the electronic exchange 1a connects the office line to the extension line. As a result, the caller and the called person can talk with each other.

If the operator at the extension keyboard unit 81, connected to the controller 5b, pushes any one of the key switches 87a to 87n, the controller 84 supplies the code signal representing the pushed key switch, via the I/O interface 83 to the controller 5b. The code signal is also transmitted to the exchange 1a through the controller 5b.

Upon receipt of the code signal, the CPU 3 of the exchange 1a supplies a ringing signal through the extension telephone line to which the pushed key switch or response key is assigned, or connects the office line to this extension telephone line, or performs the function to which the pushed key switch or response key is assigned. When LED-driving data items are transmitted from the exchange 1a to the controller 5b, the CPU 9 determines that the data items represented are to turn on or off the LEDs 87a to 87n of the extension keyboard unit 81, and therefore supplies these data items to the extension keyboard unit 81. Upon receipt of these data items, the controller 84 turns on or off the LEDs 87a to 87n, in accordance the data items and the key-assign data stored in the RAM 85.

Figure 9A:
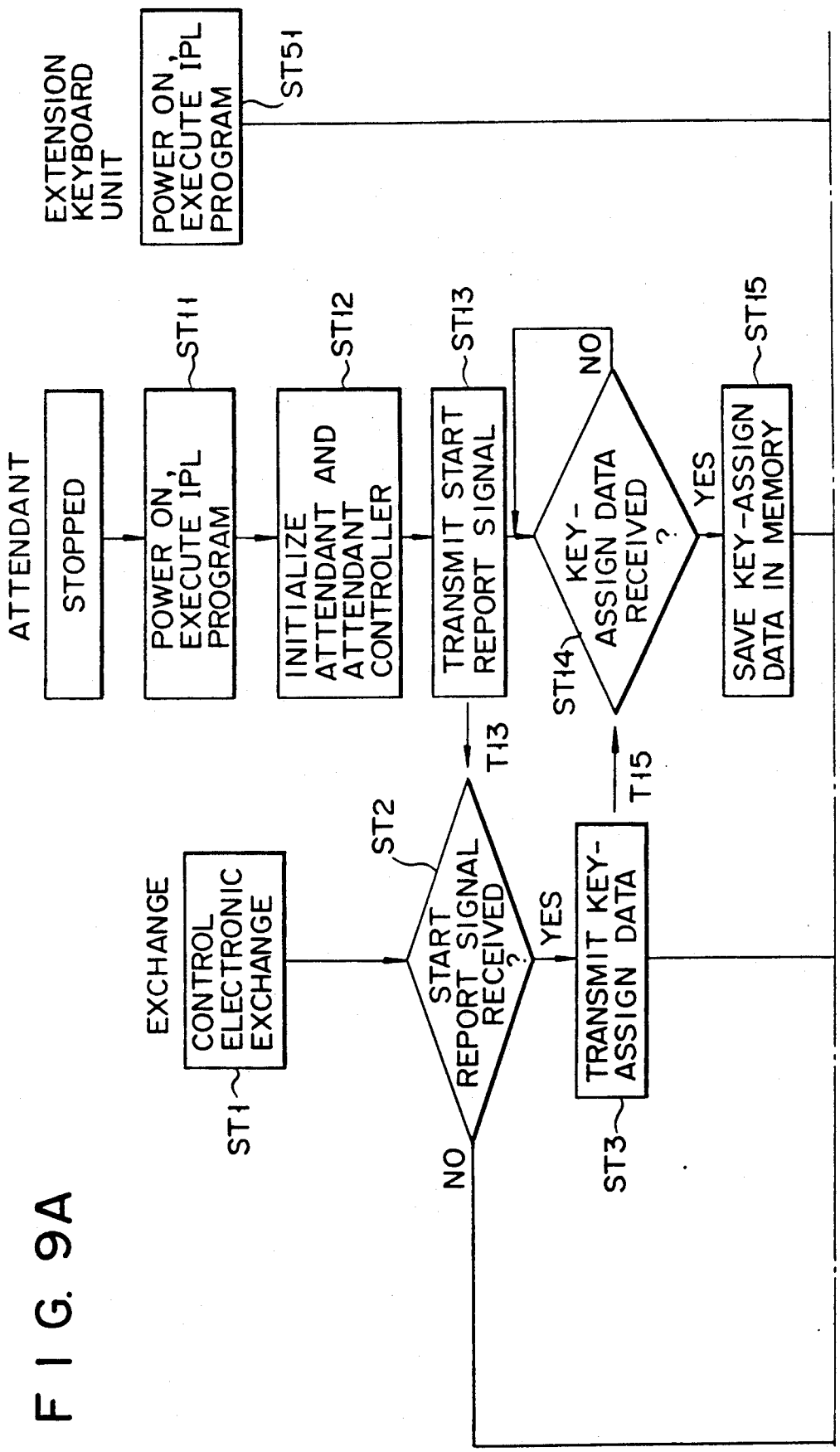
FIGS. 9A and 9B form a flow chart explaining how the system shown in FIGS. 7 and 8 operates.
Figure 9B:
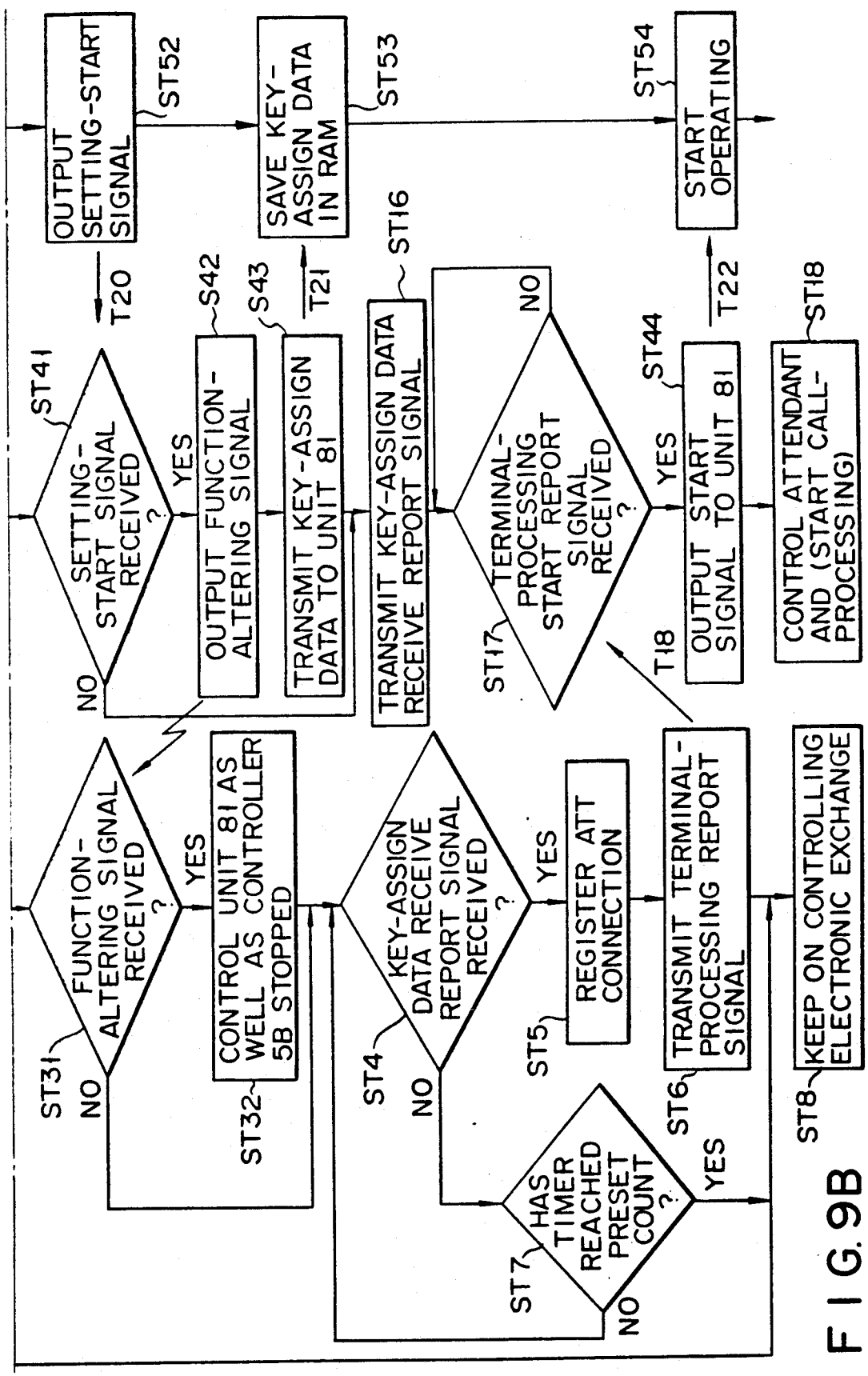
Figure 15A:
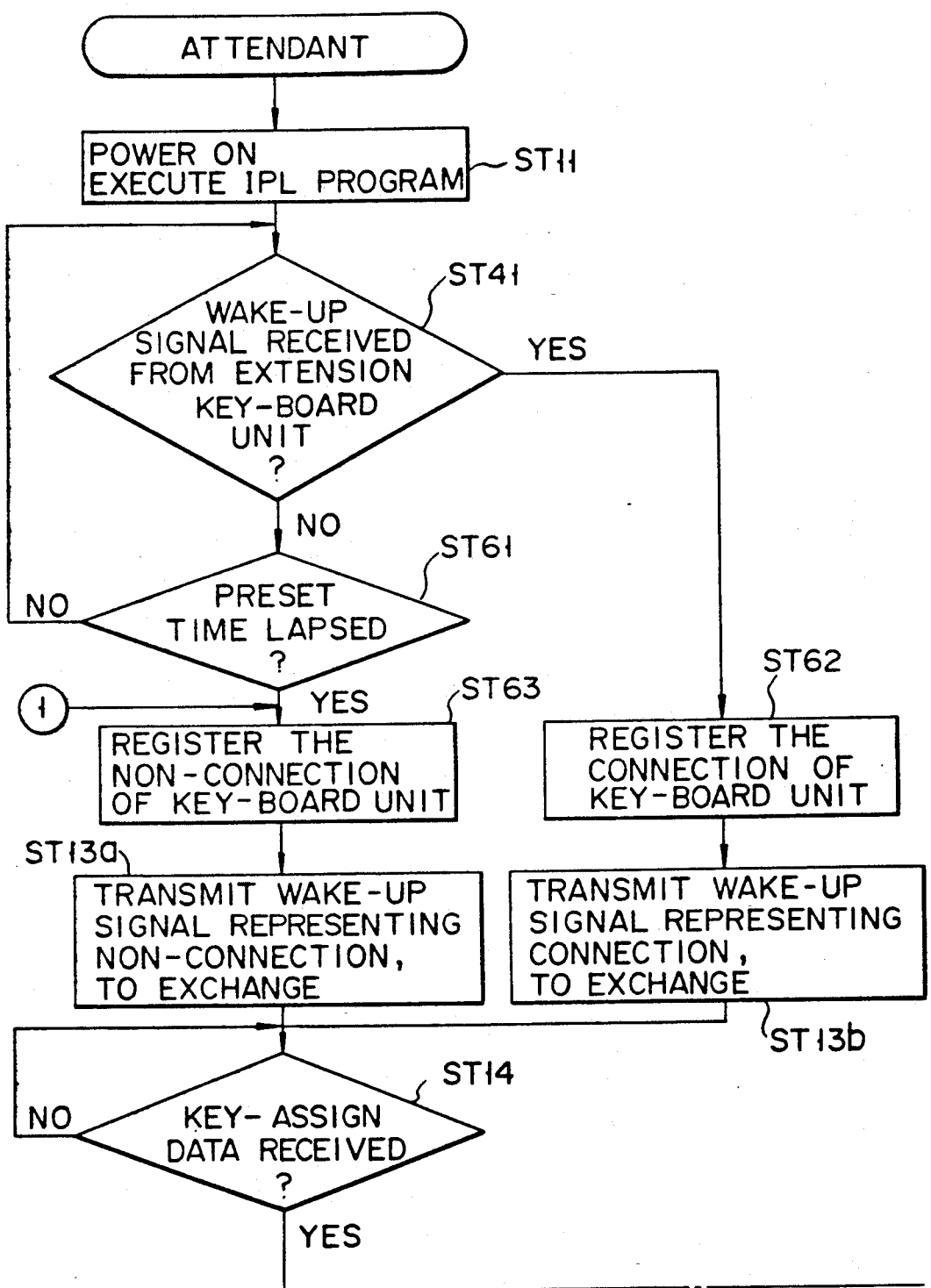

As is clearly seen from FIGS. 9A and 9B, a start report signal is transmitted from the attendant to the exchange 1a in step ST2 when the attendant is connected to the exchange 1a, and a function-altering signal is transmitted from the attendant to the exchange 1a in step ST42 when the extension keyboard unit 81 is connected to the attendant. Instead, the start report signal and the function-altering signal can be simultaneously transmitted from the attendant to the exchange 1a, as will be explained with reference to the flow chart shown in FIGS. 15A and 15B.

When the power supply to the attendant is started by either turning on the power switch 45 or connecting the line L to the modular connector 44 (if the switch 45 is not provided), a DC voltage is applied from the exchange 1a to the power unit 42. The power unit 42 converts the DC voltage to a voltage required in the attendant, and applies this voltage to the other components of the attendant. Thus, the attendant is activated in step ST11.

Then, the terminal CPU 9 incorporated in the controller 5b is initialized. The terminal CPU 9 determines, in step ST41, whether or not the attendant has received a wake-up signal from the extension keyboard unit 81. The wake-up signal is equivalent to the setting-start signal, and represents that the keyboard unit 81 is connected to the attendant. If NO in step ST41, the CPU 9 determines in step ST61 whether or not a prescribed period of time has lapsed. If NO, the operation returns to step ST41.

If YES in step ST41, that is, if the attendant received a wake-up signal, the CPU 9 stores into the memory unit 70 the data showing the connection of the keyboard unit 81 to the attendant, in step ST62. Then, in step ST13b, the CPU 9 transmits a wake-up signal to the exchange 1a, the wake-up signal representing that the keyboard unit 81 is connected to the attendant. The operation goes to step ST14.

If YES in step ST61, that is, if the prescribed period has lapsed, the operation goes to step ST63. In step ST63, the terminal CPU 9 stores into the memory unit the data showing the non-connection of the keyboard unit 81 to the attendant. Then, in step ST13a, the CPU 9 transmits a wake-up signal to the exchange 1a, the wake-up signal representing that the extension keyboard unit 81 is not connected to the attendant. In this case, too, the operation advances to step ST14.

In step ST14, the terminal CPU 9 determines whether or not the attendant has received key-assign data. If YES, the CPU 9 writes this data into the memory unit 70. Then, in step ST64, the CPU 9 determines whether or not the extension keyboard unit 81 is connected to the attendant. If YES in step ST64, the flow advances to step ST43, in which the CPU 9 transmits the key-assign data to the extension keyboard unit 81. Then, in step ST65, the CPU 9 determines whether or not the attendant has received a key-assign data receive report signal from the extension keyboard unit 81. If NO in step ST65, the CPU 9 determines in step ST66 whether or not a predetermined time has lapsed. If NO in step ST66, the operation returns to step ST65. If YES in step ST66, that is, if the attendant has received no key-assign data receive report signals from the keyboard unit 81, the flow advances to step ST63, shown in FIG. 15A.

If YES in step ST65, that is, if the attendant has received a key-assign data receive report signal within the predetermined time from the keyboard unit 81, the flow goes to step ST16, in which a key-assign data receive report signal is transmitted from the attendant to the electronic exchange 1a. Thereafter, steps ST17, ST44, and ST18 are executed, as has been explained with reference to the flow chart of FIGS. 9A and 9B.

As has just been described, if YES in step ST66, the flow advances to step ST63. Thus, in step ST63, the CPU 9 stores into the memory unit 70 the data showing that the keyboard unit 81 is not connected to the attendant. Then, in step ST13a, the CPU 9 transmits a wake-up signal to the exchange 1a, the wake-up signal showing that the keyboard unit 81 is not connected to the attendant. Thereafter, the CPU 9 executes step ST14, et seq.

The routine of waiting for a key-assign data receive report signal transmitted from the extension keyboard unit 81 is added in order to increase the reliability of the electronic exchange system. Needless to say, the controller 84 incorporated in the keyboard unit 81 transmits to the attendant the key-assign data receive report signal upon writing the key-assign data into the RAM 85. Also needless to say, the CPU 3 incorporated in the exchange 1a determines in step ST31 whether or not the exchange 1a has received a function-altering signal from the attendant, in accordance with the data received in step ST12. If YES in step ST31, the CPU 3 controls the attendant and the keyboard unit 81, thereby to alter the functions to which the key switches of the unit 81 are assigned.

In the embodiment illustrated in FIGS. 7 and 8, as can be understood from the above, the CPU 3 executes the program stored in memory unit 20, thereby controlling the other components of the exchange 1a. The CPU 9 executes the programs stored in the memory unit 70, thereby controlling the other components of the controller 5b so that the LED 14 and loudspeaker 18 of the attendant are operated. The controller 84 executes the program stored in the ROM 86, thereby controlling the LEDs 88a to 88n.

When the extension keyboard unit 81 is connected to the controller 5b, the CPU 9 determines this and supplies a function-altering signal to the electronic exchange 1a. In response to this signal, the CPU 3 supplies the key-assign signal data to the extension keyboard unit 81 via the controller 5b. Thereafter, the controller 84 of the keyboard unit 81 controls the LEDs 88a to 88n in accordance with the key-assign data. Moreover, when the controller 5b is initialized, the CPU 3 supplies the controller 5b with the key-assign data representing the functions to which the key switches 15a and 15b are assigned, and also supplies the extension keyboard unit 81 with the key-assign data representing the function to which the key switches 87a to 87n are assigned.

As can be understood from the preceding paragraph, in the electronic exchange system shown in FIGS. 7 and 8, both the key assignment of the attendant and that of that extension keyboard unit 81 can be altered by changing only the key-assign data stored in the electronic exchange 1a, unlike in the conventional system, wherein the operator must change not only the program stored in the PBX, but also the program stored in the terminal (e.g., an attendant) to alter the key assignment. It is, thus, relatively easy for the operator to assign the key switches 15a and 15b of the attendant and also the key switches 87a to 87n of the unit 81 to various functions in such a way, that he or she can more accurately and quickly operate the key-switch board. Further, the system can connect the office line to more extension telephones than in the conventional electronic exchange system in which no use is made of an additional terminal such as an extension keyboard unit 81.

As has been described above, the present invention can provide an electronic exchange system, wherein the key assignment of a terminal, such as an attendant and an extension keyboard, can easily be altered, and which is therefore operator-friendly.

The present invention is not limited to the embodiments described above with reference to the accompanying drawings. Various changes and modifications may be made without departing from the spirit or scope of the general inventive concept. For example, an attendant used in the embodiments described above can be replaced by any other type of a terminal.

In the embodiments described above, the key-assign data is transmitted to the attendant and stored in the memory unit of the attendant, and the code of any key of the attendant which is operated is determined from the key assign-data and is then transmitted from the attendant to the exchange. The exchange performs a telephone exchange in accordance with the key code transmitted from the attendant, and supplies a control command to the attendant, for turning on or off the LED associated with the operated key. Upon receipt of this command, the attendant turns on or off the LED.

Since the exchange supplies control commands to the attendant, its telephone-exchanging efficiency is lower than otherwise, particularly when it receives and send calls at high frequency. It would therefore be desirable that the exchange be relieved from this task of transmitting control commands.

According to the present invention, the CPU incorporated in the attendant can control any other component of the attendant (e.g., the LEDs), not in accordance with commands supplied from the exchange, unless the exchange must control, for specific reasons, the components of the attendant. To make the CPU control the LEDs, for example, it is sufficient to store a suitable program into the memory unit of the attendant.

What is claimed is:

1. An electronic exchange system comprising a telephone exchange for connecting at least extension lines and office lines, and at least an extension terminal which is initialized and enabled by being connected to the electronic exchange via extension line keys and designed to function as a communication device,
    said extension terminal comprising:
        a plurality of keys;
        first memory means for storing key-assign data consisting of key codes of the plurality of keys;
        data-receiving means for receiving the key-assign data when said extension terminal is initialized;
        memory control means for instructing the first memory means to store the kay-assign data which the data-receiving means has received from the telephone exchange; and
        first control means for retrieving predetermined key codes from the first memory means and for supplying the predetermined key codes to the telephone exchange when the keys identified by the key codes are operated,
    said telephone exchange comprising:
        second memory means for storing the key-assign data and the data items representing the functions to which the predetermined keys are assigned;
        second control means for retrieving the key-assign data from the second memory and for supplying the key-assign data to the extension terminal, upon determining that the extension terminal is connected to the telephone exchange; and
        third control means for performing the functions corresponding to the key codes supplied from the extension terminal and represented by the data items stored in the second memory.

2. The electronic exchange system according to claim 1, wherein said extension terminal is an attendant having a plurality of keys provided for respective extension lines, and designed to transmit a code of any key operated to said telephone exchange, and to transmit a call from said telephone exchange to the extension line connected to any key operated.

3. An electronic exchange system comprising a telephone exchange for connecting at least extension lines and office lines, at least an extension terminal adapted to be connected to the exchange via extension line keys and designed to function as a communication device, and an additional unit adapted to be connected to the extension terminal, having a plurality of keys and designed to generate the code of any one of the plurality keys that is operated,
    said additional unit comprising:
    input/output means for sending signals to said extension terminal and for receiving signals from said extension terminal;
    first memory means for storing data; and
    first control means for supplying a start signal through the input/output means when the additional unit is initialized, for storing key-assign data transmitted through the input/output means into the first memory means, for retrieving the corresponding key code of any one of the keys when the key is operated, and for outputting the corresponding key code,
    said extension terminal comprising:
        a plurality of keys;
        interface means adapted to be connected to the additional unit, for receiving signals from, and supplying signals to, the additional unit;
        second memory means for storing the key-assign data consisting of the codes of the keys of the extension terminal and the keys of the additional unit;
        data-receiving means for receiving the key-assign data when the extension terminal is initialized;
        memory control means for instructing the second memory means to store the key-assign data into the second memory means, for determining whether or not the additional unit is connected to the extension terminal, for retrieving the key-assign data for the additional unit from the second memory upon determining that the additional unit is connected to the extension terminal, and for supplying the key-assign data to the additional unit through the interface means; and, second control means for retrieving a key code from the first memory means and for supplying the key code to the telephone exchange when the key identified by the key code is operated, and for supplying the key code to said telephone exchange when the key code is transmitted to the interface means from said additional unit, and said telephone exchange comprising:
third memory means for storing the key-assign data and the data items representing the functions to which the keys are assigned;
third control means for retrieving the key-assign data from the second memory means and for supplying the key-assign data to the extension terminal, upon determining that the extension terminal is connected to the telephone exchange; and
fourth control means for performing the functions assigned to the keys corresponding to the key-assign data and represented by the data items stored in the third memory means.

4. The electronic exchange system according to claim 3, wherein said extension terminal is an attendant having a plurality of keys provided for respective extension lines, and designed to transmit the key code of any key operated to said telephone exchange, and to transmit a call from said telephone exchange to the extension line connected to any key operated.

5. An electronic exchange system comprising a telephone exchange for connecting at least extension lines and office lines, and at least an extension terminal which is initialized and enabled by being connected to the telephone exchange via extension line keys and designed to function as a communication device, said extension terminal comprising:
first memory means for storing key-assign data consisting of key codes of the extension line keys;
memory control means for instructing the first memory means to store the key-assign data which has been transmitted from the telephone exchange, said control means being enabled to receive the key-assign data when said extension terminal is initialized; and
first control means for retrieving predetermined key codes from the first memory means and for supplying the predetermined key codes to the telephone exchange when the keys corresponding to the key codes are operated, said telephone exchange comprising:
second memory means for storing the key-assign data and the data items representing the functions to which the predetermined keys are assigned;
second control means for retrieving the key-assign data from the second memory and for supplying the key-assign data to the extension terminal, upon determining that the extension terminal is connected to the telephone exchange; and
third control means for performing the functions corresponding to the key codes supplied from the extension terminal and represented by the data items stored in the second memory.

6. The electronic exchange system according to claim 5, wherein said extension terminal is an attendant having a plurality of keys provided for respective extension lines, and designed to transmit the key code of any key operated to said telephone exchange, and to transmit a call from said telephone exchange to the extension line connected to any key operated.

7. A method of controlling an electronic exchange system which comprises a telephone exchange for connecting at least extension lines and office lines, and at least an extension terminal which is initialized and enabled by being connected to the telephone exchange via extension keys, said method comprising the steps of:

storing key-assign data consisting of key codes of the extension keys and also the data items representing the functions to which the extension keys are assigned, into the telephone exchange when said extension terminal is initialized;
determining whether or not the extension terminal is connected to the telephone exchange, and supplying the key-assign data to the extension terminal when it is determined that the extension terminal is connected to the telephone exchange;
enabling the extension terminal to receive the key-assign data when the extension terminal is initialized, and storing the key-assign data into the extension terminal when the extension terminal receives the key-assign data;
supplying predetermined key codes from the extension terminal to the telephone exchange when the extension keys identified by the key codes are operated; and
causing the telephone exchange to perform the functions corresponding to the key codes supplied from the extension terminal and represented by the data items stored in the telephone exchange.

8. A method of controlling an electronic exchange system which comprises a telephone exchange for connecting at least extension lines and office lines, and at least an extension terminal adapted to be connected to the telephone exchange via extension line keys and designed to function as a telephone, and an additional unit adapted to be connected to the extension terminal and having a plurality of additional keys, said method comprising the steps of:

storing key-assign data consisting of codes of the extension line keys of the extension terminal and the plurality of additional keys of the additional unit and also data items representing the functions to which the extension line keys and the plurality of additional keys are assigned into the telephone exchange;
determining whether or not the extension terminal is connected to the telephone exchange, and supplying the key-assign data to the extension terminal when it is determined that the extension terminal is connected to the telephone exchange;
enabling the extension terminal to receive key-assign data from the telephone exchange when the extension terminal is initialized, and storing the key-assign data into the extension terminal when the key-assign data is transmitted to the extension terminal from the telephone exchange;
determining whether or not the additional unit is connected to the extension terminal, and supplying the key-assign data for the additional unit from the extension terminal to the additional unit when it is determined that the additional unit is connected to the extension terminal;
storing into the additional unit the key-assign data which is supplied from the extension terminal;
supplying a corresponding key code from the additional unit to the extension terminal when a perdetermined key identified by the corresponding key code is operated;

supplying the corresponding key code from the extension terminal to the telephone exchange when the predetermined key of the extension terminal, which is identified by the corresponding key code, is operated, and also supplying to the telephone exchange the key code, if any, which has been transmitted from the additional unit to the extension terminal; and causing the telephone exchange to perform the functions corresponding to the key codes supplied from the extension terminal and represented by the data items stored in the telephone exchange.

* * * * *